(12) United States Patent
Isbrucker et al.

(10) Patent No.: US 10,551,547 B2
(45) Date of Patent: Feb. 4, 2020

(54) TROFFER LUMINAIRE

(71) Applicant: Quarkstar LLC, Las Vegas, NV (US)

(72) Inventors: Victor E. Isbrucker, Sturgeon Point (CA); Ingo Speier, Saanichton (CA)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 15/525,027

(22) PCT Filed: Nov. 6, 2015

(86) PCT No.: PCT/US2015/059596
§ 371 (c)(1),
(2) Date: May 5, 2017

(87) PCT Pub. No.: WO2016/073937
PCT Pub. Date: May 12, 2016

(65) Prior Publication Data
US 2018/0284339 A1   Oct. 4, 2018

Related U.S. Application Data

(60) Provisional application No. 62/077,151, filed on Nov. 7, 2014.

(51) Int. Cl.
*F21V 8/00* (2006.01)
*F21V 7/00* (2006.01)
(Continued)

(52) U.S. Cl.
CPC ............ *G02B 6/0045* (2013.01); *F21S 8/026* (2013.01); *F21V 7/0016* (2013.01);
(Continued)

(58) Field of Classification Search
CPC ..... G02B 6/0045; G02B 6/0073; F21S 8/026; F21S 8/00; F21V 7/0025; F21V 7/0016;
(Continued)

(56) References Cited

U.S. PATENT DOCUMENTS 5,530,628 A   6/1996 Ngai
5,581,683 A   12/1996 Bertignoll et al.
(Continued)

FOREIGN PATENT DOCUMENTS

CN        1818459 A      8/2006
DE   102012107437 A1    6/2014
(Continued)

OTHER PUBLICATIONS

International Application No. PCT/US2015/059596, Notification of Transmittal of the International Search Report and the Written Opinion of the International Searching Authority, dated Jan. 25, 2016, 21 pages.
(Continued)

*Primary Examiner* — Anh T Mai
*Assistant Examiner* — Jessica M Apenteng
(74) *Attorney, Agent, or Firm* — Fish & Richardson P.C.

(57) ABSTRACT

A troffer luminaire including (i) a light guide luminaire module having an optical extractor, and (ii) a reflector, where the reflector is configured to reflect light output by the optical extractor in a backward angular range toward a target surface in a forward angular range, and where a combination of the optical extractor and the first reflector is configured such that a ratio of maximum luminance to minimum luminance across the first reflector is less than a first predetermined ratio.

21 Claims, 13 Drawing Sheets

(51) Int. Cl.
*F21S 8/02* (2006.01)
*F21S 8/00* (2006.01)
*F21W 131/301* (2006.01)
*F21Y 103/10* (2016.01)
*F21Y 115/10* (2016.01)

(52) U.S. Cl.
CPC .......... *F21V 7/0025* (2013.01); *F21V 7/0091* (2013.01); *F21S 8/00* (2013.01); *F21V 7/0033* (2013.01); *F21W 2131/301* (2013.01); *F21Y 2103/10* (2016.08); *F21Y 2115/10* (2016.08); *G02B 6/0073* (2013.01)

(58) Field of Classification Search
CPC .. F21V 7/0091; F21V 7/0033; F21Y 2115/10; F21Y 2103/10; F21W 2131/301
USPC .......................................................... 362/608
See application file for complete search history.

(56) References Cited

U.S. PATENT DOCUMENTS

| | | | |
|---|---|---|---|
| 7,740,366 | B2 | 6/2010 | Tetsuo |
| 7,942,565 | B2 | 5/2011 | Klick et al. |
| 8,556,456 | B2 | 10/2013 | Boonekamp et al. |
| 9,746,596 | B2 | 8/2017 | Preston |
| 9,766,385 | B2 | 9/2017 | Boonekamp |
| 10,209,429 | B2 | 2/2019 | Van De Ven et al. |
| 2006/0221613 | A1 | 10/2006 | Coushaine |
| 2006/0250814 | A1 | 11/2006 | Tabor |
| 2008/0204888 | A1 | 8/2008 | Kan |
| 2009/0201698 | A1 | 8/2009 | Klick |
| 2012/0140461 | A1 | 6/2012 | Pickard |
| 2013/0039050 | A1 | 2/2013 | Dau et al. |
| 2013/0063962 | A1 | 3/2013 | Huang et al. |
| 2013/0208457 | A1 | 8/2013 | Durkee et al. |
| 2013/0258699 | A1 | 10/2013 | Weaver |
| 2014/0126235 | A1 | 5/2014 | Speier |
| 2014/0160779 | A1 | 6/2014 | Pusch |
| 2014/0211496 | A1 | 7/2014 | Durkee |

FOREIGN PATENT DOCUMENTS

| | | |
|---|---|---|
| DE | 102013211868 A1 | 12/2014 |
| EP | 1744096 A2 | 1/2007 |
| EP | 2161494 A1 | 3/2010 |
| EP | 2327340 A1 | 6/2011 |
| EP | 2778512 A1 | 9/2014 |
| EP | 2886937 A1 | 6/2015 |
| FR | 2934353 B1 | 3/2011 |
| JP | 2014229510 A | 12/2014 |
| WO | WO2008017968 A2 | 2/2008 |
| WO | WO2012059852 A1 | 5/2012 |
| WO | WO2013023008 A1 | 2/2013 |
| WO | WO2012105314 A1 | 7/2014 |
| WO | WO2014124229 A1 | 8/2014 |
| WO | WO2015113979 A1 | 8/2015 |

OTHER PUBLICATIONS

European Patent Application No. 15 802 239.2, Communication pursuant to Article 94(3) EPC, dated May 4, 2018, 44 pages.
International Application No. PCT/US2015/059513, Notification of Transmittal of the International Search Report and the Written Opinion of the International Searching Authority, dated Mar. 31, 2016, 21 pages.
European Application No. 15 802 235.0, Communication pursuant to Article 94(3) EPC, dated Jun. 22, 2018, 9 pages.

TROFFER LUMINAIRE

CROSS-REFERENCE TO RELATED APPLICATIONS

This application is a U.S. National phase application of International Application No. PCT/US2015/059596, filed on Nov. 6, 2015, which claims benefit under 35 U.S.C. § 119(e)(1) of U.S. Provisional Application No. 62/077,151, filed on Nov. 7, 2014, incorporated by reference herein.

TECHNICAL FIELD

The present disclosure relates generally to luminaire modules for illuminating target surfaces, for example to troffer luminaires including solid state-based light guide illumination devices.

BACKGROUND

Light sources are used in a variety of applications, such as providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and solid state light sources, such as light-emitting diodes (LEDs).

SUMMARY

Troffer luminaires are disclosed that include a solid state-based light guide illumination device and one or two tertiary reflectors. Components of some of the disclosed troffer luminaires are configured such that the one or two tertiary reflectors appear to be uniformly lit when viewed by an observer, for example from directly underneath the illumination device. Moreover, components of some of the disclosed troffer luminaires are configured such that the illumination device blends together with the one or two tertiary reflectors as they appear to be uniformly lit when viewed by an observer, for example from directly underneath the illumination device. The foregoing uniformity of luminance across the one or two tertiary reflectors is quantified in terms of a ratio of maximum luminance to minimum luminance across the one or two tertiary reflectors.

In general, innovative aspects of the technologies described herein can be implemented in an illumination device that includes one or more of the following aspects:

In a first aspect, an illumination device includes a plurality of light-emitting elements (LEEs) arranged to emit light in a forward direction, the LEEs distributed along a transverse direction orthogonal to the forward direction; a light guide comprising a pair of opposing side surfaces arranged in parallel along the transverse direction and extending from a receiving end of the light guide to an opposing end of the light guide, the light guide configured to guide light received at the receiving end from the LEEs in the forward direction to the opposing end; an optical extractor elongated along the transverse direction and located at the opposing end of the light guide to redirect at least some of the guided light and to output at least some of the redirected light in an ambient environment as first output light in a first backward angular range along a first one of the pair of opposing side surfaces of the light guide; and a first reflector adjacent the first one of the pair of opposing side surfaces of the light guide and spaced apart from the optical extractor to reflect the light in the first backward angular range in a first forward angular range toward a target surface. Further, a first combination of the optical extractor and the first reflector is configured such that a ratio of maximum luminance to minimum luminance across the first reflector is less than a first predetermined ratio.

The foregoing and other embodiments can each optionally include one or more of the following features, alone or in combination. In some implementations, the first predetermined ratio can be less than 5:1. In some cases, the first predetermined ratio is less than 3:1.

In some implementations, the optical extractor can include a solid optic including: an input surface to receive the guided light, a first forward output surface that is flat, the first forward output surface to transmit at least a portion of the guided light to the ambient environment in a third forward angular range, a first backward output surface that is convex and extends between the input surface and the first forward output surface, and a first redirecting surface that extends between the input surface and the first forward output surface, the first redirecting surface to reflect another portion of the guided light toward first backward output surface, the first backward output surface to transmit the reflected light to the ambient environment in the first backward angular range. In some cases, the first backward output surface can be a diffuse-transmissive surface. In some cases, the first redirecting surface can be convex over a portion adjacent to the input surface and can be flat over a portion adjacent the first forward output surface. Here, the first redirecting surface and the first forward output surface can intersect at a vertex.

In some implementations, the first reflector can include a diffuse-reflective surface. In some implementations, the illumination device can include one or more optical couplers. Here, the light provided by the LEEs is in a first angular range, the optical couplers are arranged to receive the light provided by the LEEs and redirect it to the receiving end of the light guide in a second angular range, and a numerical aperture of the light guide is such that the light received from the optical couplers in the second angular range can be guided by the light guide through TIR off the pair of opposing side surfaces. In some implementations, the LEEs are LEDs that emit white light. In some implementations, a distance from an edge of the first reflector adjacent the light guide to an edge of the optical extractor remote from the light guide can be less than 3". In some implementations, the first reflector can be concave and has a sag that is less than 3".

In some implementations, the optical extractor can be configured to output some other of the redirected light in the ambient environment as second output light in a second backward angular range along a second one of the pair of opposing side surfaces of the light guide. Here, the illumination device can further include a second reflector adjacent the second one of the pair of opposing side surfaces of the light guide and spaced apart from the optical extractor to reflect the light in the second backward angular range in a second forward angular range toward the target surface. Here, a second combination of the optical extractor and the second reflector is configured such that a ratio of maximum luminance to minimum luminance across the second reflector is less than a second predetermined ratio. In some cases, the second predetermined ratio is equal to the first predetermined ratio. In some cases, a third combination of the optical extractor, the first reflector and the second reflector can be configured such that a ratio of maximum luminance to minimum luminance across the optical extractor, the first reflector and the second reflector is less than a third predetermined ratio. For example, the third predetermined ratio can be less than 20:1.

In some implementations, the optical extractor includes a solid optic including: an input surface to receive the guided light, a first forward output surface that is flat and a second forward output surface that is flat, the first and second forward output surfaces arranged to be mirror symmetric relative to the light guide and configured to transmit a portion of the guided light to the ambient environment in a third forward angular range, a first backward output surface that is convex and extends between the input surface and the first forward output surface, and a second backward output surface that is convex and extends between the input surface and the second forward output surface, the first and second backward output surfaces arranged to be mirror symmetric relative to the light guide, a third forward output surface configured to transmit another portion of the guided light to the ambient environment in the third forward angular range, and a first redirecting surface that extends between the first forward output surface and the third forward output surface, and a second redirecting surface that extends between the second forward output surface and the third forward output surface, the first and second redirecting surfaces arranged to be mirror symmetric relative to the light guide, the first redirecting surface to reflect yet another portion of the guided light toward the first backward output surface, the first backward output surface to transmit the light reflected by the first redirecting surface to the ambient environment in the first backward angular range, and the second redirecting surface to reflect the remaining guided light toward the second backward output surface, the second backward output surface to transmit the light reflected by the second redirecting surface to the ambient environment in the second backward angular range. In some cases, the third forward output surface can be concave. In some cases the first and second reflectors are arranged to be mirror symmetric relative to the light guide. In some cases, the first and second reflectors can include diffuse-reflective surfaces.

In some implementations, a troffer luminaire can include the foregoing illumination device and a housing configured to support the illumination device. In some cases, a dimension of the housing along the forward direction can be less than 3".

The illumination devices described in this specification may be configured to use light flux originating from one or more primary solid state light sources of known dimensional, geometric, brightness and uniformity characteristics, and a secondary reflector/refractor/combination optic to output a specified radiation pattern. The secondary optic can redistribute the source flux's "phase-space" to a new phase-space of prescribed dimensional extent and angular divergence (e.g., directional cosines) while maintaining a substantially uniform intensity from the secondary optic. The disclosed illumination devices can provide uniform illumination of a target surface, efficient energy conversion from the primary solid state light sources of the illumination devices to the target surface, and uniform and/or glare-free intensity from the fixture itself when viewed from the target surface. Additionally, the disclosed illumination devices can provide glare-free intensity characteristics while maintaining efficiency and directionality in flux redirection.

The details of one or more implementations of the technologies described herein are set forth in the accompanying drawings and the description below. Other features, aspects, and advantages of the disclosed technologies will become apparent from the description, the drawings, and the claims.

Reference numbers and designations in the various drawings indicate exemplary aspects, implementations of particular features of the present disclosure.

DETAILED DESCRIPTION

Figure 1:
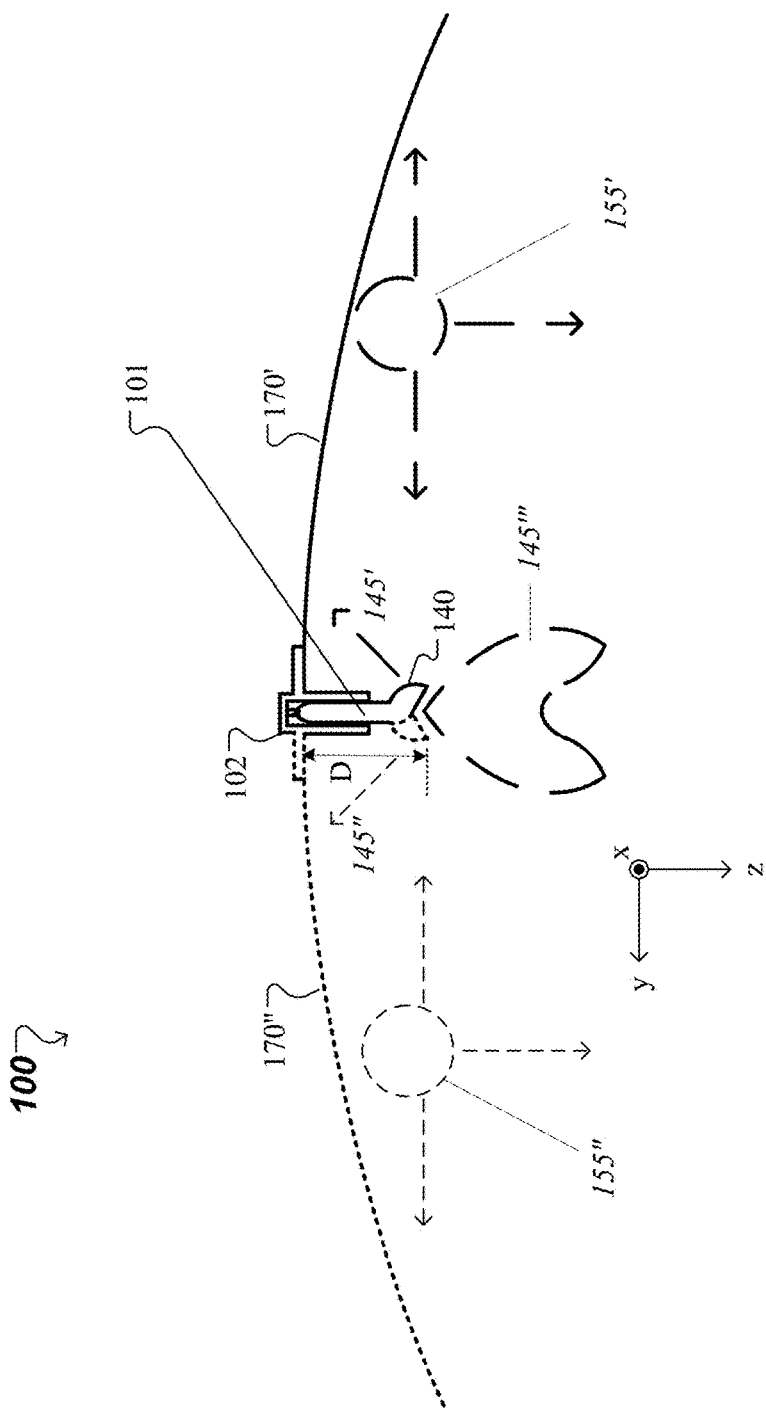
FIG. 1 shows an example of a troffer luminaire that includes a light guide luminaire module and one or more tertiary reflectors that appear to be uniformly lit when viewed by an observer from directly underneath the light guide luminaire module.

FIG. 1 shows an example of a troffer luminaire 100 for providing illumination to a target surface. The troffer luminaire 100 includes (i) a light guide luminaire module 101, also referred to as an illumination device, having solid state light sources, and (ii) at least a first tertiary reflector 170'. In some implementations, the troffer luminaire 100 includes a second tertiary reflector 170", in addition to the first tertiary reflector 170'. Note that the tertiary reflectors 170', 170" also are referred to, simply, as reflectors 170', 170". In this example, the troffer luminaire 100 further includes a housing 102 that supports the light guide luminaire module 101 and the one or two tertiary reflectors 170', 170". As such, the troffer luminaire 100 can efficiently guide, distribute and redirect light emitted by solid-state light sources of the light guide luminaire module 101 towards target surfaces, e.g., towards a floor, one or more workbenches, etc. For example, light emitted by the solid-state light sources is coupled into an end of a light guide of the light guide luminaire module 101 and guided in a forward direction (e.g., along the z-axis) to an opposing end thereof where an optical extractor 140 of the light guide luminaire module redirects at least a portion of the guided light in a first backward angular range 145' towards the first tertiary reflector 170'. And, when the second tertiary reflector also is included in the troffer luminaire 100, another portion of the guided light in a second backward angular range 145" towards the second tertiary reflector 170". The first tertiary reflector 170' reflects the light redirected in the first backward angular range 145' in a first forward angular range 155' toward the target surface. And, when the second tertiary reflector also is included in the troffer luminaire 100, the light redirected in the second backward angular range 145" in a second forward angular range 155" toward the target surface.

As used herein, providing light in an "angular range" refers to providing light that propagates in one or more prevalent directions in which each has a divergence with respect to the corresponding prevalent direction. In this context, the term "prevalent direction of propagation" refers to a direction along which a portion of an intensity distribution of the propagating light has a maximum. For example, the prevalent direction of propagation associated with the angular range can be an orientation of a lobe of the (angular) intensity distribution. (See, e.g., FIG. 2C.) Also in this context, the term "divergence" refers to a solid angle outside of which the intensity distribution of the propagating light drops below a predefined fraction of a maximum of the intensity distribution. For example, the divergence associated with the angular range can be the width of the lobe of the intensity distribution. The predefined fraction can be 50%, 10%, 5%, 1%, or other values, depending on the lighting application.

In some implementations, an output surface of the optical extractor 140 is a Fresnel-transmissive surface (i.e., most of light that transmits through such a surface undergoes refraction, and no more than 4% of it undergoes back reflection) and a corresponding reflective surface of each of the tertiary reflectors 170', 170" is a diffuse-reflective surface (i.e., light reflected off such a surface undergoes diffusive scattering). In other implementations, the output surface of the optical extractor 140 is a diffuse-transmissive surface (i.e., most of light that transmits through such a surface undergoes diffusive scattering) and a corresponding reflective surface of each of the tertiary reflectors 170', 170" is a specular-reflective surface (i.e., light reflected off such a surface undergoes specular reflection). In some other implementations, each of the output surface of the optical extractor 140 and a corresponding reflective surface of each of the tertiary reflectors 170', 170" includes a diffuse-reflective surface. As such, an intensity profile of the light provided by the troffer luminaire 100 in the first forward angular range 155' is a Lambertian profile (represented in FIG. 1 by a first "uniform" lobe). And, when the second tertiary reflector also is included in the troffer luminaire 100, an intensity profile of the light provided by the troffer luminaire in the second forward angular range 155" also is a Lambertian profile (represented in FIG. 1 by a second "uniform" lobe). The light issued by the troffer luminaire 100 in the first and second forward angular ranges 155', 155" is said to provide indirect illumination to the target surface.

Additionally, a remaining portion of the guided light is output by the optical extractor 140 of the light guide luminaire module 101 in a third forward angular range 145'''. In the example implementation illustrated in FIG. 1, an exit surface of the optical extractor 140 is a Fresnel-transmissive surface, such that an intensity profile of the light issued by the troffer luminaire 100 in the third forward angular range 145''' is a "batwing" profile (represented in FIG. 1 by a batwing-shaped lobe). In other implementations, the exit surface of the optical extractor 140 is a diffusive-transmissive surface, such that the intensity profile of the light issued by the troffer luminaire 100 in the third forward angular range 145''' is a Lambertian profile similar to the Lambertian profiles of the light in the first and second forward angular ranges 155', 155". The light issued by the troffer luminaire 100 in the third forward angular ranges 145''' is said to provide direct illumination to the target surface.

Microstructure characteristics that determine reflectivity and/or diffusivity of (i) the output surface(s) and the exit surface of the optical extractor 140, and (ii) the corresponding reflective surfaces of the tertiary reflectors 170', 170" can be configured such that the direct illumination represents a predetermined fraction of the illumination provided by the troffer luminaire 100 to the target surface, and the indirect illumination represents the inverse of the predetermined fraction. For example, the foregoing reflectivity and/or diffusivity characteristics can be implemented such that the illumination provided by the troffer luminaire 100 is between 40-90% indirect illumination and between 60-10% direct illumination.

In addition, (i) the output surface(s) of the optical extractor 140, and (ii) the corresponding reflective surfaces of the tertiary reflectors 170', 170" can be shaped and arranged such that each of the tertiary reflectors 170', 170" appears to be uniformly lit when viewed by an observer of the troffer luminaire 100 from directly underneath the optical extractor. The foregoing uniformity of luminance across each of the tertiary reflectors 170', 170" is quantified in terms of a ratio of maximum luminance to minimum luminance across each of the tertiary reflectors. For example, a ratio of maximum luminance to minimum luminance across each of the tertiary reflectors 170', 170" can be lower than 5:1, 4:1 or 3:1. In this manner, the observer can view a fully lit surface of each of the tertiary reflectors 170', 170" free of dark regions and/or hot spots.

In some cases, both the microstructure and the shape/arrangement (i) the output surface(s) of the optical extractor 140, and (ii) the corresponding reflective surfaces of the tertiary reflectors 170', 170" can be configured such that a bottom portion of the optical extractor 140 blends together with the one or two tertiary reflectors as they (i.e., the bottom portion of the optical extractor and the one or two tertiary reflectors) appear to be uniformly lit when viewed by an observer of the troffer luminaire 100 from directly underneath the optical extractor. The foregoing uniformity of luminance across the bottom portion of the optical extractor 140 and the one or two tertiary reflectors 170', 170" is quantified in terms of a ratio of maximum luminance to minimum luminance across the bottom portion of the optical extractor and the one or two tertiary reflectors. For example, a ratio of maximum luminance to minimum luminance across the bottom portion of the optical extractor 140 and the one or two tertiary reflectors 170', 170" can be lower than 25:1, 20:1 or 15:1.

The troffer luminaire 100 can be suspended adjacent to, or can be disposed in a recession of, a ceiling above a target surface. Efficiency of the troffer luminaire 100, defined as the fraction of the light emitted by the solid-state light sources of the light guide luminaire module 101 that is provided to the target surface, can reach 90%.

Prior to describing details of various embodiments of the optical extractor 140 of the light guide luminaire module 101 and of the two tertiary reflectors 170', 170" of the troffer luminaire 100, components of a similar light guide luminaire module are generally described, and another troffer luminaire is described for which the indirect illumination is non-Lambertian.

Light Guide Luminaire Module

Figure 2A:
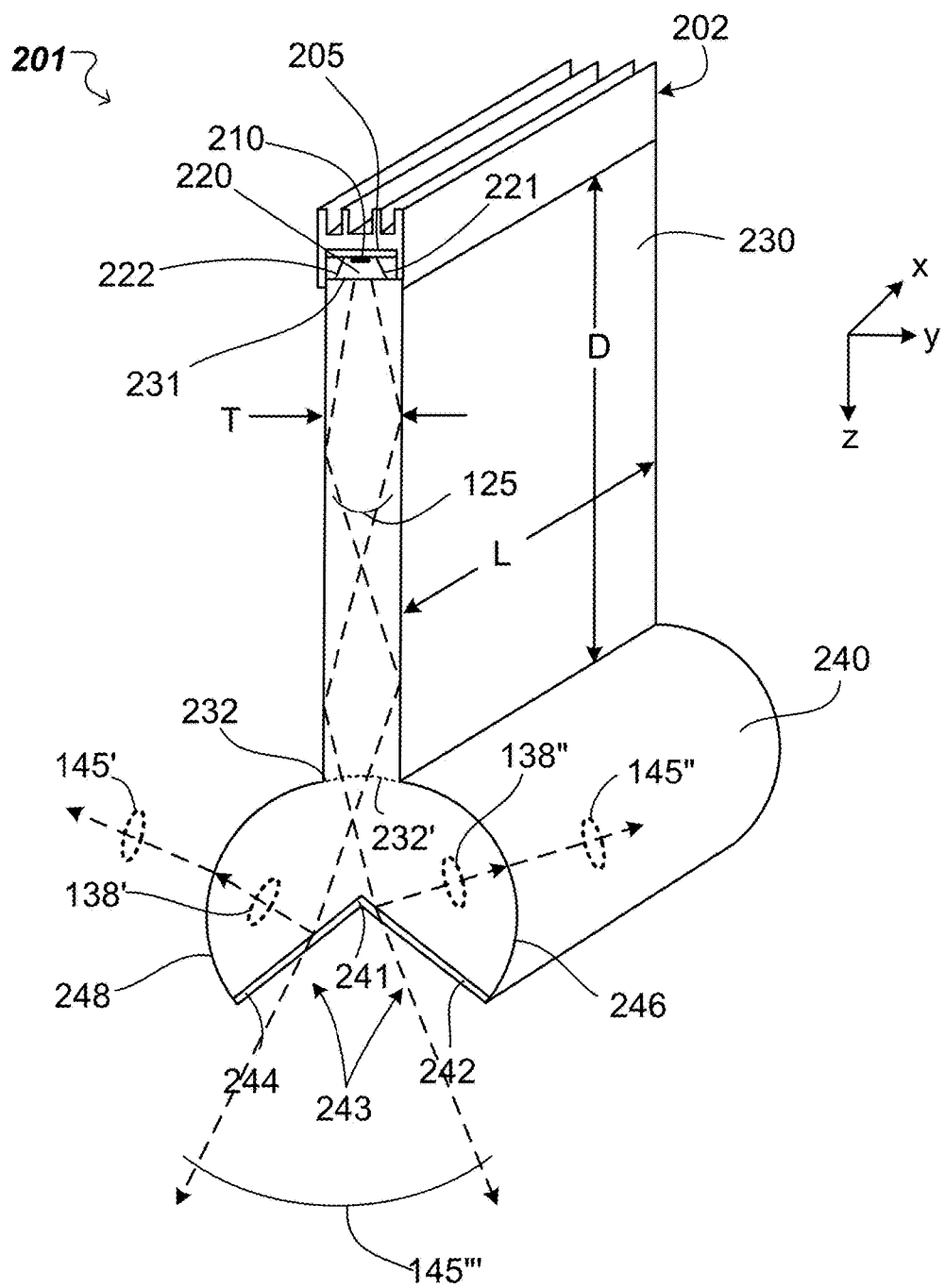
FIGS. 2A-2C show aspects of light guide luminaire modules.

Referring to FIG. 2A, a light guide luminaire module 201, simply referred to as a luminaire module 201, includes a substrate 205 having a plurality of LEEs 210 distributed along a first surface of the substrate 205. The mount with the LEEs 210 is disposed at a first (e.g., upper) edge 231 of a light guide 230. Once again, the positive z-direction is referred to as the "forward" direction and the negative z-direction is the "backward" direction. Sections through the luminaire module 201 parallel to the x-z plane are referred to as the "cross-section" or "cross-sectional plane" of the luminaire module. Also, luminaire module 201 extends along the y-direction, so this direction is referred to as the "longitudinal" direction of the luminaire module. Implementations of luminaire modules can have a plane of symmetry parallel to the y-z plane, be curved or otherwise shaped. This is referred to as the "symmetry plane" of the luminaire module.

Multiple LEEs 210 are disposed on the first surface of the substrate 205, although only one of the multiple LEEs 210 is shown in FIG. 2A. For example, the plurality of LEEs 210 can include multiple white LEDs. The LEEs 210 are optically coupled with one or more optical couplers 220 (only one of which is shown in FIG. 2A). An optical extractor 240 is disposed at second (e.g., lower) edge 232 of light guide 230.

Substrate 205, light guide 230, and optical extractor 240 extend a length L along the y-direction, so that the luminaire module is an elongated luminaire module with an elongation of L that may be about parallel to a wall of a room (e.g., a ceiling of the room). Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, or, 150 cm or more).

The number of LEEs 210 on the substrate 205 will generally depend, inter alia, on the length L, where more LEEs are used for longer luminaire modules. In some implementations, the plurality of LEEs 210 can include between 10 and 1,000 LEEs (e.g., about 50 LEEs, about 100 LEEs, about 200 LEEs, about 500 LEEs). Generally, the density of LEEs (e.g., number of LEEs per unit length) will also depend on the nominal power of the LEEs and illuminance desired from the luminaire module. For example, a relatively high density of LEEs can be used in applications where high illuminance is desired or where low power LEEs are used. In some implementations, the luminaire module 201 has LEE density along its length of 0.1 LEE per centimeter or more (e.g., 0.2 per centimeter or more, 0.5 per centimeter or more, 1 per centimeter or more, 2 per centimeter or more). The density of LEEs may also be based on a desired amount of mixing of light emitted by the multiple LEEs. In implementations, LEEs can be evenly spaced along the length, L, of the luminaire module. In some implementations, the substrate 205 can be attached to a housing 202 configured as a heat-sink to extract heat emitted by the plurality of LEEs 210. A surface of the substrate 205 that contacts the housing 202 opposes the side of the substrate 205 on which the LEEs 210 are disposed. The luminaire module 201 can include one or multiple types of LEEs, for example one or more subsets of LEEs in which each subset can have different color or color temperature.

Optical coupler 220 includes one or more solid pieces of transparent optical material (e.g., a glass material or a transparent plastic, such as polycarbonate or acrylic) having surfaces 221 and 222 positioned to reflect light from the LEEs 210 towards the light guide 230. In general, surfaces 221 and 222 are shaped to collect and at least partially collimate light emitted from the LEEs. In the x-z cross-sectional plane, surfaces 221 and 222 can be straight or curved. Examples of curved surfaces include surfaces having a constant radius of curvature, parabolic or hyperbolic shapes. In some implementations, surfaces 221 and 222 are coated with a highly reflective material (e.g., a reflective metal, such as aluminum or silver), to provide a highly reflective optical interface. The cross-sectional profile of optical coupler 220 can be uniform along the length L of luminaire module 201. Alternatively, the cross-sectional profile can vary. For example, surfaces 221 and/or 222 can be curved out of the x-z plane.

The exit aperture of the optical coupler 220 adjacent upper edge of light guide 231 is optically coupled to edge 231 to facilitate efficient coupling of light from the optical coupler 220 into light guide 230. For example, the surfaces of a solid coupler and a solid light guide can be attached using a material that substantially matches the refractive index of the material forming the optical coupler 220 or light guide 230 or both (e.g., refractive indices across the interface are different by 2% or less.) The optical coupler 220 can be affixed to light guide 230 using an index matching fluid, grease, or adhesive. In some implementations, optical coupler 220 is fused to light guide 230 or they are integrally formed from a single piece of material (e.g., coupler and light guide may be monolithic and may be made of a solid transparent optical material).

Light guide 230 is formed from a piece of transparent material (e.g., glass material such as BK7, fused silica or quartz glass, or a transparent plastic, such as polycarbonate or acrylic) that can be the same or different from the material forming optical couplers 220. Light guide 230 extends length L in the y-direction, has a uniform thickness T in the x-direction, and a uniform depth D in the z-direction. The dimensions D and T are generally selected based on the desired optical properties of the light guide (e.g., which spatial modes are supported) and/or the direct/indirect intensity distribution. During operation, light coupled into the light guide 230 from optical coupler 220 (with an angular range 125) reflects off the planar surfaces of the light guide by TIR and spatially mixes within the light guide. The mixing can help achieve illuminance and/or color uniformity, along the x-axis, at the distal portion of the light guide 232 at optical extractor 240. The depth, D, of light guide 230 can be selected to achieve adequate uniformity at the exit aperture (i.e., at end 232) of the light guide. In some implementations, D is in a range from about 1 cm to about 20 cm (e.g., 2 cm or more, 4 cm or more, 6 cm or more, 8 cm or more, 10 cm or more, 12 cm or more).

In general, optical couplers 220 are designed to restrict the angular range of light entering the light guide 230 (e.g., to within +/−40 degrees) so that at least a substantial amount of the light (e.g., 95% or more of the light) is optically coupled into spatial modes in the light guide 230 that undergoes TIR at the planar surfaces. Light guide 230 can have a uniform thickness T, which is the distance separating two planar opposing surfaces of the light guide. Generally, T is sufficiently large so the light guide has an aperture at first (e.g., upper) surface 231 sufficiently large to approximately match (or exceed) the exit aperture of optical coupler 220. In some implementations, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the implementation, the narrower the light guide the better it may spatially mix light. A narrow light guide also provides a narrow exit aperture. As such light emitted from the light guide can be considered to resemble the light emitted from a one-dimensional linear light source, also referred to as an elongate virtual filament.

While optical coupler 220 and light guide 230 are formed from solid pieces of transparent optical material, hollow structures are also possible. For example, the optical coupler 220 or the light guide 230 or both may be hollow with reflective inner surfaces rather than being solid. As such material cost can be reduced and absorption in the light guide can be mitigated. A number of specular reflective materials may be suitable for this purpose including materials such as 3M Vikuiti™ or Miro IV™ sheet from Alanod Corporation where greater than 90% of the incident light can be efficiently guided to the optical extractor.

Optical extractor 240 is also composed of a solid piece of transparent optical material (e.g., a glass material or a transparent plastic, such as polycarbonate or acrylic) that can be the same as or different from the material forming light guide 230. In the example implementation shown in FIG. 2A, the optical extractor 240 includes redirecting (e.g., flat) surfaces 242 and 244 and curved surfaces 246 and 248. The flat surfaces 242 and 244 represent first and second portions of a redirecting surface 243, while the curved surfaces 246 and 248 represent first and second output surfaces of the luminaire module 201.

Surfaces 242 and 244 are coated with a reflective material (e.g., a highly reflective metal such as aluminum or silver) over which a protective coating may be disposed. For example, the material forming such a coating may reflect about 95% or more of light incident thereon at appropriate (e.g., visible) wavelengths. Here, surfaces 242 and 244 provide a highly reflective optical interface for light having the angular range 125 entering an input end of the optical extractor 232' from light guide 230. As another example, the surfaces 242 and 244 include portions that are transparent to the light entering at the input end 232' of the optical extractor 240. Here, these portions can be uncoated regions (e.g., partially silvered regions) or discontinuities (e.g., slots, slits, apertures) of the surfaces 242 and 244. As such, some light is transmitted in the forward direction (along the z-axis) through surfaces 242 and 244 of the optical extractor 240 in a third forward angular range 145'''. In some cases, the light transmitted in the third forward angular range 145''' is refracted. In this way, the redirecting surface 243 acts as a beam splitter rather than a mirror, and transmits in the third forward angular range 145''' a desired portion of incident light, while reflecting the remaining light in angular ranges 138 and 138'.

In the x-z cross-sectional plane, the lines corresponding to surfaces 242 and 244 have the same length and form an apex or vertex 241, e.g. a v-shape that meets at the apex 241. In general, an included angle (e.g., the smallest included angle between the surfaces 244 and 242) of the redirecting surfaces 242, 244 can vary as desired. For example, in some implementations, the included angle can be relatively small (e.g., from 30° to 60°). In certain implementations, the included angle is in a range from 60° to 120° (e.g., about 90°). The included angle can also be relatively large (e.g., in a range from 120° to 150° or more). In the example implementation shown in FIG. 2A, the output surfaces 246, 248 of the optical extractor 240 are curved with a constant radius of curvature that is the same for both. In an aspect, the output surfaces 246, 248 may have optical power (e.g., may focus or defocus light.) Accordingly, luminaire module 201 has a plane of symmetry intersecting apex 241 parallel to the y-z plane.

The surface of optical extractor 240 adjacent to the lower edge 232 of light guide 230 is optically coupled to edge 232. For example, optical extractor 240 can be affixed to light guide 230 using an index matching fluid, grease, or adhesive. In some implementations, optical extractor 240 is fused to light guide 230 or they are integrally formed from a single piece of material.

The emission spectrum of the luminaire module 201 corresponds to the emission spectrum of the LEEs 210. However, in some implementations, a wavelength-conversion material may be positioned in the luminaire module, for example remote from the LEEs, so that the wavelength spectrum of the luminaire module is dependent both on the emission spectrum of the LEEs and the composition of the wavelength-conversion material. In general, a wavelength-conversion material can be placed in a variety of different locations in luminaire module 201. For example, a wavelength-conversion material may be disposed proximate the LEEs 210, adjacent surfaces 242 and 244 of optical extractor 240, on the exit surfaces 246 and 248 of optical extractor 240, and/or at other locations.

The layer of wavelength-conversion material (e.g., phosphor) may be attached to light guide 230 held in place via a suitable support structure (not illustrated), disposed within the extractor (also not illustrated) or otherwise arranged, for example. Wavelength-conversion material that is disposed within the extractor may be configured as a shell or other object and disposed within a notional area that is circumscribed between R/n and $R*(1+n^2)^{(-1/2)}$, where R is the radius of curvature of the light-exit surfaces (246 and 248 in FIG. 2A) of the extractor 240 and n is the index of refraction of the portion of the extractor that is opposite of the wavelength-conversion material as viewed from the reflective surfaces (242 and 244 in FIG. 2A). The support structure may be a transparent self-supporting structure. The wavelength-conversion material diffuses light as it converts the wavelengths, provides mixing of the light and can help uniformly illuminate a surface of the ambient environment.

During operation, light exiting light guide 230 through end 232 impinges on the reflective interfaces at portions of the redirecting surface 242 and 244 and is reflected outwardly towards output surfaces 246 and 248, respectively, away from the symmetry plane of the luminaire module. The first portion of the redirecting surface 242 provides light having an angular distribution 138 towards the output surface 246, the second portion of the redirecting surface 244 provides light having an angular distribution 138' towards the output surface 246. The light exits optical extractor through output surfaces 246 and 248. In general, the output surfaces 246 and 248 have optical power, to redirect the light exiting the optical extractor 240 in first and second backward angular ranges 145', 145'', respectively. For example, optical extractor 240 may be configured to emit light upwards (i.e., towards the plane intersecting the LEEs and parallel to the x-y plane), downwards (i.e., away from that plane) or both upwards and downwards. In general, the direction of light exiting the luminaire module through surfaces 246 and 248 depends on the divergence of the light exiting light guide 230 and the orientation of surfaces 242 and 244.

Surfaces 242 and 244 may be oriented so that little or no light from light guide 230 is output by optical extractor 240 in certain directions. In implementations where the luminaire module 201 is attached to a ceiling of a room (e.g., the forward direction is towards the floor) such configurations can help avoid glare and an appearance of non-uniform illuminance.

In general, the light intensity distribution provided by luminaire module 201 reflects the symmetry of the luminaire module's structure about the y-z plane. For example, referring to FIG. 2C, light output in first backward angular range 145' corresponds to the first output lobe 145a of the far-field light intensity distribution 290, light output in second backward angular range 145" corresponds to the second output lobe 145b of the far-field light intensity distribution 290 and light output (leaked) in third forward angular range 145'" corresponds to the third output lobe 145c of the far-field light intensity distribution 290. In general, an intensity profile of luminaire module 201 will depend on the configuration of the optical coupler 220, the light guide 230 and the optical extractor 240. For instance, the interplay between the shape of the optical coupler 220, the shape of the redirecting surface 243 of the optical extractor 240 and the shapes of the output surfaces 246, 248 of the optical extractor 240 can be used to control the angular width and prevalent direction (orientation) of the output first 145a and second 145b lobes in the far-field light intensity profile 101. Additionally, a ratio of an amount of light in the combination of first 145a and second 145b output lobes and light in the third output lobe 145c is controlled by reflectivity and transmissivity of the redirecting surfaces 242 and 244. For example, for a reflectivity of 90% and transmissivity of 10% of the redirecting surfaces 242, 244, 45% of light can be output in the first backward angular range 145' corresponding to the first output lobe 145a, 45% light can be output in the second backward angular range 145" corresponding to the second output lobe 145b, and 10% of light can be output in the third forward angular range 145'" corresponding to the third output lobe 145c.

In some implementations, the orientation of the output lobes 145a, 145b can be adjusted based on the included angle of the v-shaped groove 241 formed by the portions of the redirecting surface 242 and 244. For example, a first included angle results in a far-field light intensity distribution 101 with output lobes 145a, 145b located at relatively smaller angles compared to output lobes 145a, 145b of the far-field light intensity distribution 101 that results for a second included angle larger than the first angle. In this manner, light can be extracted from the luminaire module 201 in a more forward direction for the smaller of two included angles formed by the portions 242, 244 of the redirecting surface 243.

Furthermore, while surfaces 242 and 244 are depicted as planar surfaces, other shapes are also possible. For example, these surfaces can be curved or faceted. Curved redirecting surfaces 242 and 244 can be used to narrow or widen the output lobes 145a, 145b. Depending of the divergence of the angular range 125 of the light that is received at the input end of the optical extractor 232', concave reflective surfaces 242, 244 can narrow the lobes 145a, 145b output by the optical extractor 240 (and illustrated in FIG. 2C), while convex reflective surfaces 242, 244 can widen the lobes 145a, 145b output by the optical extractor 240. As such, suitably configured redirecting surfaces 242, 244 may introduce convergence or divergence into the light. Such surfaces can have a constant radius of curvature, can be parabolic, hyperbolic, or have some other curvature.

In general, the geometry of the elements can be established using a variety of methods. For example, the geometry can be established empirically. Alternatively, or additionally, the geometry can be established using optical simulation software, such as Lighttools™, Tracepro™, FRED™ or Zemax™, for example.

Figure 2B:
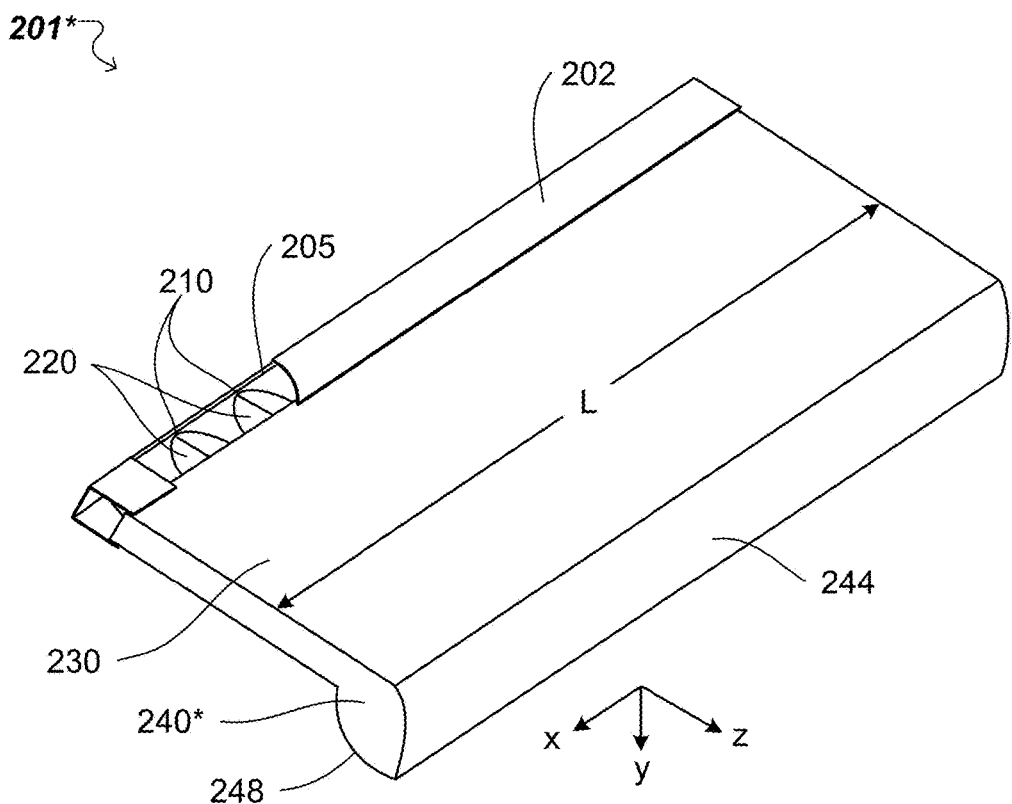
Figure 2C:
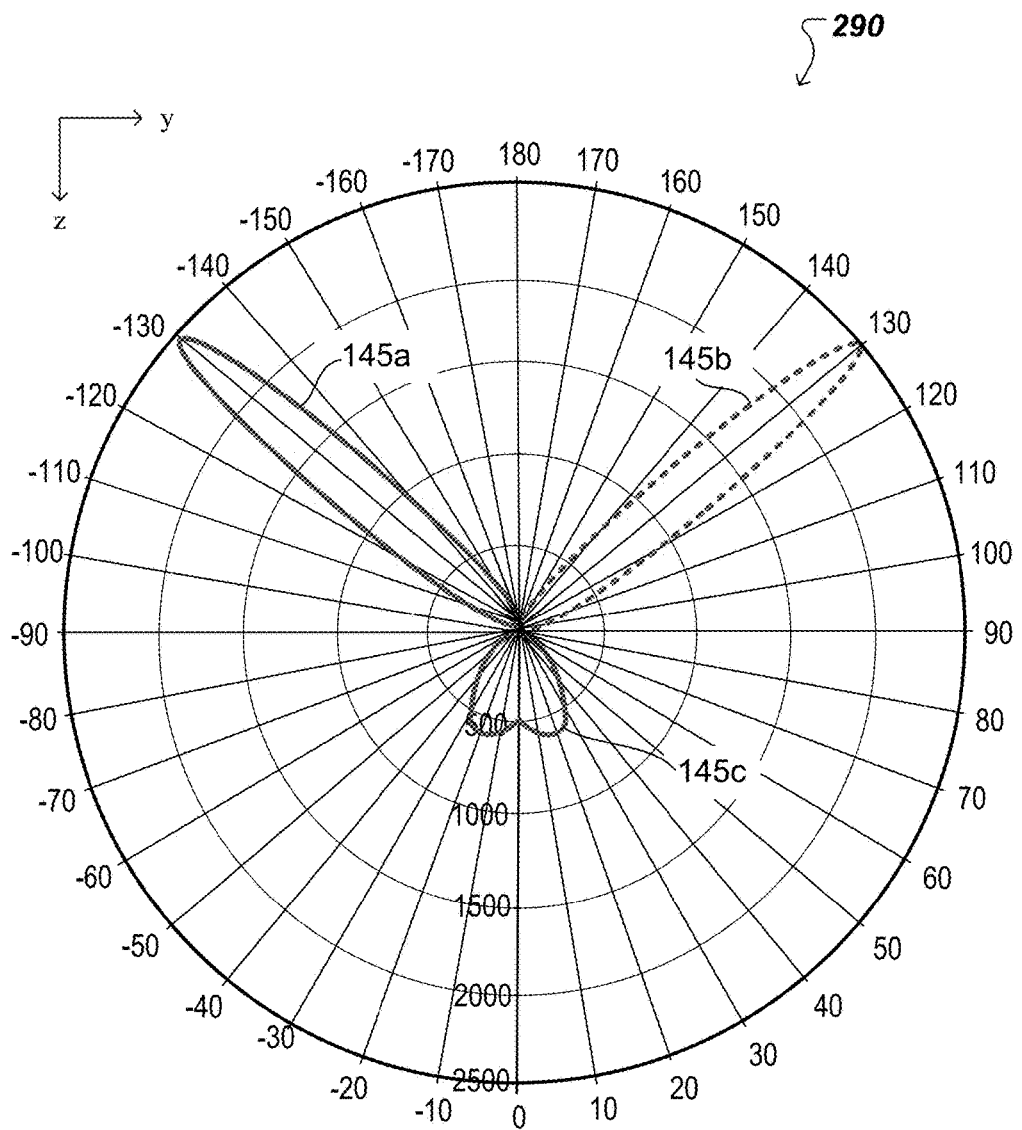

In general, luminaire module 201 can be designed to output light into different first and second backward angular ranges 145', 145" from those shown in FIG. 2A. In some implementations, illumination devices can output light into lobes 145a, 145b that have a different divergence or propagation direction than those shown in FIG. 2C. For example, in general, the output lobes 145a, 145b can have a width of up to about 90° (e.g., 80° or less, 70° or less, 60° or less, 50° or less, 40° or less, 30° or less, 20° or less). In general, the direction in which the output lobes 145a, 145b are oriented can also differ from the directions shown in FIG. 2C. The "direction" refers to the direction at which a lobe is brightest. In FIG. 2C, for example, the output lobes 145a, 145b are oriented at approx. −130° and approximately +130°. In general, output lobes 145a, 145b can be directed more towards the horizontal (e.g., at an angle in the ranges from −90° to −135°, such as at approx. −90°, approx. −100°, approx. −110°, approx. −120°, approx. −130°, and from +90° to +135°, such as at approx. +90°, approx. +100°, approx. +110°, approx. +120°, approx. +130°.

The luminaire modules can include other features useful for tailoring the intensity profile. For example, in some implementations, luminaire modules can include an optically diffuse material that can diffuse light in a controlled manner to aid homogenizing the luminaire module's intensity profile. For example, surfaces 242 and 244 can be roughened or a diffusely reflecting material, rather than a specular reflective material, can be coated on these surfaces. Accordingly, the optical interfaces at surfaces 242 and 244 can diffusely reflect light, scattering light into broader lobes than would be provided by similar structures utilizing specular reflection at these interfaces. In some implementations these surfaces can include structure that facilitates various intensity distributions. For example, surfaces 242 and 244 can each have multiple planar facets at differing orientations. Accordingly, each facet will reflect light into different directions. In some implementations, surfaces 242 and 244 can have structure thereon (e.g., structural features that scatter or diffract light).

Surfaces 246 and 248 need not be surfaces having a constant radius of curvature. For example, surfaces 246 and 248 can include portions having differing curvature and/or can have structure thereon (e.g., structural features that scatter or diffract light). In certain implementations, a light scattering material can be disposed on surfaces 246 and 248 of optical extractor 240.

In some implementations, optical extractor 240 is structured so that a negligible amount (e.g., less than 1%) of the light propagating within at least one plane (e.g., the x-z cross-sectional plane) that is reflected by surface 242 or 244 experiences TIR at light-exit surface 246 or 248. For certain spherical or cylindrical structures, a so-called Weierstrass condition can avoid TIR. A Weierstrass condition is illustrated for a circular structure (i.e., a cross section through a cylinder or sphere) having a surface of radius R and a concentric notional circle having a radius R/n, where n is the refractive index of the structure. Any light ray that passes through the notional circle within the cross-sectional plane is incident on the surface of the circular structure and has an angle of incidence less than the critical angle and will exit the circular structure without experiencing TIR. Light rays propagating within the spherical structure in the plane but not emanating from within notional surface can impinge on the surface of radius R at the critical angle or greater angles of incidence. Accordingly, such light may be subject to TIR and won't exit the circular structure. Furthermore, rays of p-polarized light that pass through a notional space circumscribed by an area with a radius of curvature that is smaller than $R/(1+n^2)^{(-1/2)}$, which is smaller than $R/n$, will be subject to small Fresnel reflection at the surface of radius R when exiting the circular structure. This condition may be referred to as Brewster geometry. Implementations may be configured accordingly.

Referring again to FIG. 2A, in some implementations, all or part of surfaces 242 and 244 may be located within a notional Weierstrass surface defined by surfaces 246 and 248. For example, the portions of surfaces 242 and 244 that receive light exiting light guide 230 through end 232 can reside within this surface so that light within the x-z plane reflected from surfaces 242 and 244 exits through surfaces 246 and 248, respectively, without experiencing TIR.

In the example implementations described above in connection with FIG. 2A, the luminaire module 201 is configured to output light into first and second backward angular ranges 145' and 145" and in third forward angular range 145'". In other implementations, the light guide-based luminaire module 201 is modified to output light into a single backward angular range 145'. FIG. 2B shows such light guide-based luminaire module 201* configured to output light on a single side of the light guide is referred to as a single-sided luminaire module. The single-sided luminaire module 201* is elongated along the x-axis like the luminaire module 201 shown in FIG. 2A. Also like the luminaire module 201, the single-sided luminaire module 201* includes a substrate 205 and LEEs 210 disposed on a surface of the substrate 205 along the x-axis to emit light in a first angular range. The single-sided luminaire module 201* further includes optical couplers 220 arranged and configured to redirect the light emitted by the LEEs 210 in the first angular range into a second angular range 125 that has a divergence smaller than the divergence of the first angular range at least in the x-z cross-section. Also, the single-sided luminaire module 201* includes a light guide 230 to guide the light redirected by the optical couplers 220 in the second angular range 125 from a first end 231 of the light guide to a second end 232 of the light guide. Additionally, the single-sided luminaire module 201* includes a single-sided extractor (denoted 240*) to receive the light guided by the light guide 230. The single-sided extractor 240* includes a redirecting surface 244 to redirect some of the light received from the light guide 230 into a third angular range 138', like described for luminaire module 201 with reference to FIG. 2A, and an output surface 248 to output the light redirected by the redirecting surface 244 in the third angular range 138' into a first backward angular range 145'. Also as described in FIG. 2A, the redirecting surface 244 is configured to leak some the light received from the light guide 230 into a third forward angular range 145'".

A light intensity profile of the single-sided luminaire module 201* is represented in FIG. 2C as the first output lobe 145a and the third output lobe 145c. The output lobe 145a corresponds to light output by the single-sided luminaire module 201* in the first backward angular range 145' and the output lobe 145c corresponds to light output by the single-sided luminaire module 201* in the third forward angular range 145'".

In general, the light guide luminaire module 200* can be combined with a single tertiary reflector to provide (i) indirect illumination to a first portion of a target surface from light output by the light guide luminaire module 200* in the first backward angular range 145' and redirected by the tertiary reflector to a first forward angular range 155', and (ii) direct illumination to a second, different portion of the target surface from light output by the light guide luminaire module 200* in the third forward angular range 145'". Further, the light guide luminaire module 200 can be combined with a pair of tertiary reflectors to provide (i) indirect illumination to first and second different portions of a target surface from light output by the light guide luminaire module 200 in the respective first and second backward angular ranges 145', 145" and respectively redirected by the tertiary reflectors to first and second forward angular ranges 155', 155", and (ii) direct illumination to a third portion of the target surface, different from the first and second portions, from light output by the light guide luminaire module 200 in the third forward angular range 145'". An example of the latter combination is described below.

Figure 3A:
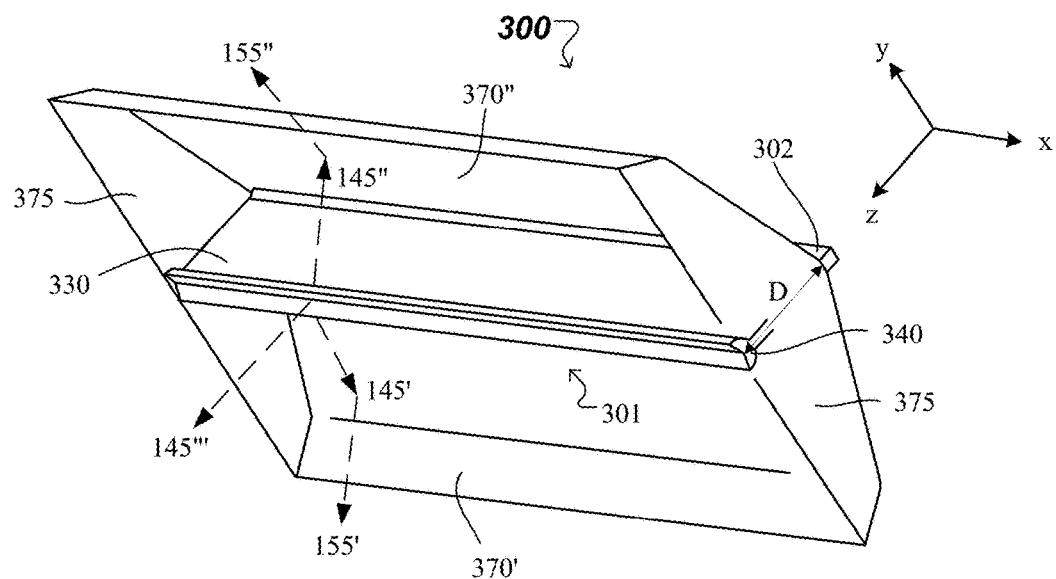
FIGS. 3A-3B show aspects of a troffer luminaire including a light guide luminaire module and a pair of tertiary reflectors.

First Embodiment of Troffer Luminaire Including Light Guide Luminaire Module and Tertiary Reflectors FIG. 3A shows a troffer luminaire 300 that includes a light guide luminaire module 301 and tertiary reflectors 370', 370". The light guide luminaire module 301 can be implemented as the light guide luminaire module 201 described above in connection with FIG. 2A. The troffer luminaire 300 also includes a housing 302 that supports the light guide luminaire module 301 and the tertiary reflectors 370', 370". While a plurality of LEEs and the optical couplers of the light guide luminaire module 301 are housed within the housing 302 (and not visible in FIG. 3A), a light guide 330 of light guide luminaire module protrudes from the housing to lower an optical extractor 340 of light guide luminaire module by a distance D along the z-axis comparable to a sag of the tertiary reflectors 370', 370" in the (y,z) plane. The housing 302 and the tertiary reflectors 370', 370" can be formed of extruded aluminum. In this example, the tertiary reflectors 370', 370" are closed off at two ends by walls 375. In FIG. 3A, one of walls 375 is illustrated in cut away to better show a portion of light guide 330 and optical extractor 340.

In some embodiments, the troffer luminaire 300 includes a transparent plate positioned, for example, to form, together with the tertiary reflectors 370', 370", an enclosure to protect the light guide luminaire module 301 from dust or other environmental effects. In some cases, the troffer luminaire 300 can have a 2'×2' or 2'×4' footprint (e.g., in the x-y plane), corresponding to the size of conventional fluorescent light luminaires.

Figure 3B:
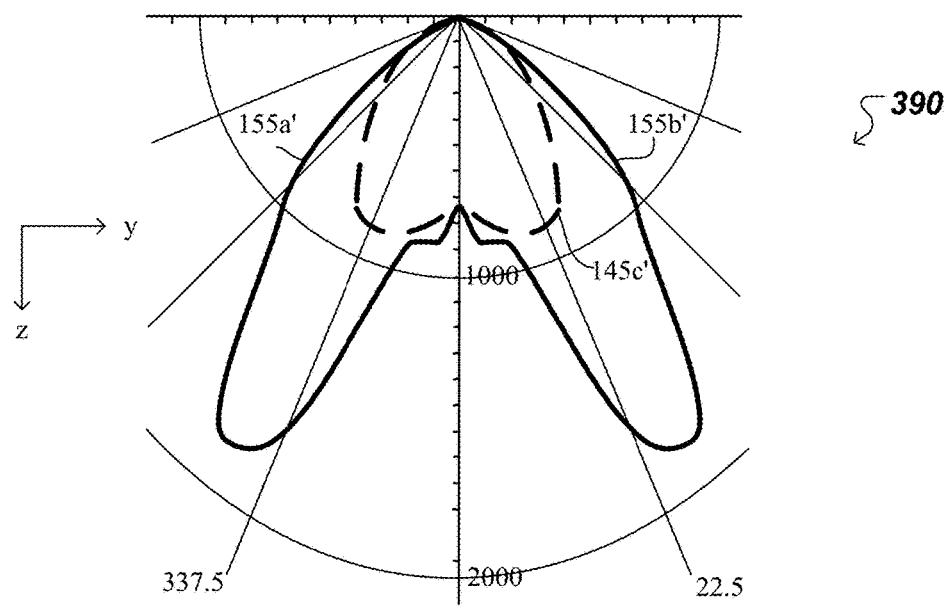

A surface of the first tertiary reflector 370' is treated to specularly reflect light output by the light guide luminaire module 301 in a first backward angular range 145' towards a first portion of a target surface in a first forward angular range 155'. And, a surface of the second tertiary reflector 370" is treated to specularly reflect light output by the light guide luminaire module 301 in a second backward angular range 145" towards a second portion of the target surface in a second forward angular range 155". Moreover, a redirecting surface of the optical extractor 340 is semitransparent to transmit part of the guided light in a third forward angular range 145'" towards a third portion of the target surface, where the third portion is sandwiched between the first and second portions. FIG. 3B shows an example distribution 390 of intensity of light provided by the troffer luminaire 300 to a target. The light intensity distribution 390 includes a first output lobe 155a' corresponding to light issued by the troffer luminaire 300 in the first forward angular range 155', a second output lobe 155b' corresponding to light issued by the troffer luminaire in the second forward angular range 155", and a third output lobe 145c' corresponding to light issued by the troffer luminaire in the third forward angular range 145'''.

As described above, composition and geometry of components of the light guide luminaire module 301 determine the shape, angular orientation and magnitude of the output lobes 155a', 155b' and 145c' of the light intensity distribution 390 associated with the troffer luminaire 300. For example, in some embodiments, the optical extractor 340 and the tertiary reflectors 370', 370" can be configured to direct substantially all of the light into a range of angles between 315° and 45° in a cross-sectional plane of the luminaire 300, where 0° corresponds to the forward direction. The forward direction is parallel to the light guide 330, and can be toward the floor for a troffer luminaire 300 mounted on a ceiling. The first and second output lobes 155a' and 155b' have respective maxima at about 330° and 30° and a width of less than 10° each. The third output lobe 145c' has a batwing profile and fills a polar space between the first and second output lobes 155a' and 155b'. The troffer luminaire 300 is configured to direct little or no illumination into certain angular ranges, e.g., close to the plane of the ceiling to avoid glare. For example, in the present example, the troffer luminaire 300 directs almost no illumination in ranges from 55° to 90° and from 270° to 305° relative to the forward direction. This may be advantageous because illumination propagating from a troffer luminaire at such shallow angles can be perceived as glare in certain applications (e.g., in office lighting).

Referring again to FIG. 3A, note while a combination of shapes and relative orientations of the optical extractor 340 of the light guide luminaire module 301 and the tertiary reflectors 370', 370" have been configured to obtain a specified intensity distribution (e.g., 390) of the light output by the troffer luminaire 300, the foregoing combination does not necessarily ensure that luminance across each of the tertiary reflectors satisfies a certain specified luminance uniformity. Example troffer luminaires that satisfy the latter specification are described below.

Figure 4A:
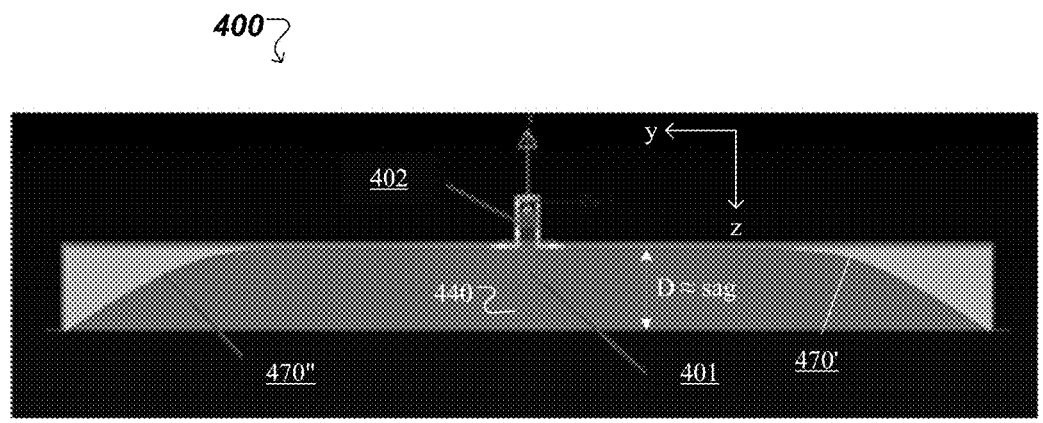
FIGS. 4A-4B show aspects of another troffer luminaire including a symmetric light guide luminaire module and a pair of tertiary reflectors that appear to be uniformly lit when viewed by an observer from directly underneath the light guide luminaire module.
Figure 4B:
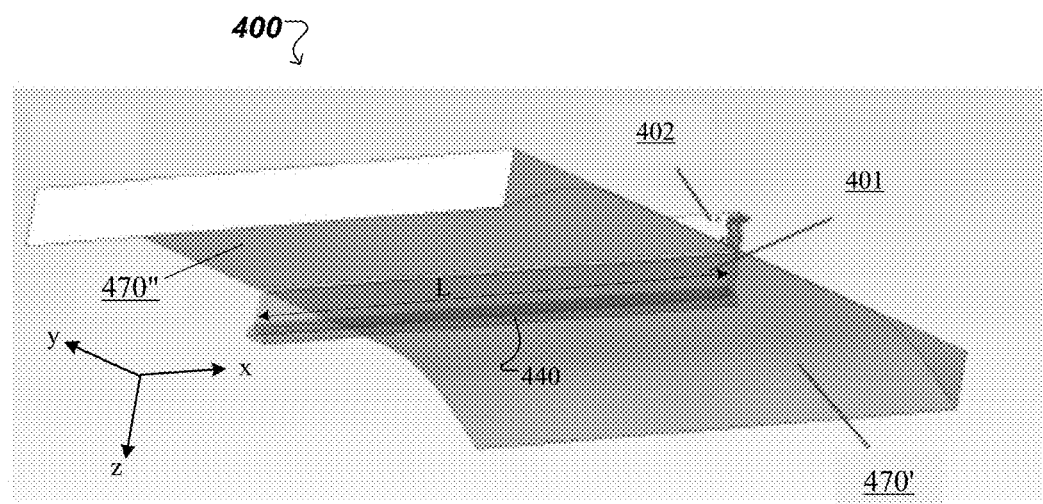

Second Embodiment of Troffer Luminaire
Including Light Guide Luminaire Module and
Tertiary Reflectors FIGS. 4A-4B show a side view and a perspective view, respectively, of a troffer luminaire 400 that includes a light guide luminaire module 401 and tertiary reflectors 470', 470". Solid state light sources, optical couplers and a light guide of the light guide luminaire module 401 can be implemented like the corresponding components of the light guide luminaire module 201 described above in connection with FIG. 2A. An optical extractor 440 of the light guide luminaire module 401 is mirror symmetric relative to the z-axis (which coincides with the optical axis of the light guide luminaire module 401) and can be implemented as described below in connection with FIGS. 5A-5F. Respective "front faces" (referred to as reflective surfaces) of the tertiary reflectors 470', 470", that face the light guide luminaire module 401, can be implemented as described below in connection with FIG. 5G, while "rear faces" can be implemented as a solid block or can have other forms/shapes. Note that while the plurality of solid state light sources and the optical couplers of the light guide luminaire module 401 are housed within the housing 402 (and not visible in FIGS. 4A-4B), the light guide of light guide luminaire module protrudes from the housing to lower the optical extractor 440 of light guide luminaire module by a distance D along the z-axis comparable to a sag of the tertiary reflectors 470', 470" in the (y,z) plane. The light guide luminaire module 401 and the tertiary reflectors 470', 470" are elongated along the x-axis and can have a length L of about 2' or 4', corresponding to the size of conventional fluorescent light luminaires.

In this implementation, output surfaces of the optical extractor 440 of the light guide luminaire module 401, and corresponding reflective surfaces of the tertiary reflectors 470', 470" are shaped and arranged with respect to one another such that each of the tertiary reflectors 470', 470" appears to be uniformly lit when viewed by an observer of the troffer luminaire 400 from directly underneath the optical extractor. For example, a ratio of maximum luminance to minimum luminance across each of the tertiary reflectors 470', 470" can be lower than 5:1, 4:1 or 3:1. In this manner, the observer can view a fully lit surface of each of the tertiary reflectors 470', 470" free of dark regions and/or hot spots.

Figure 5A:
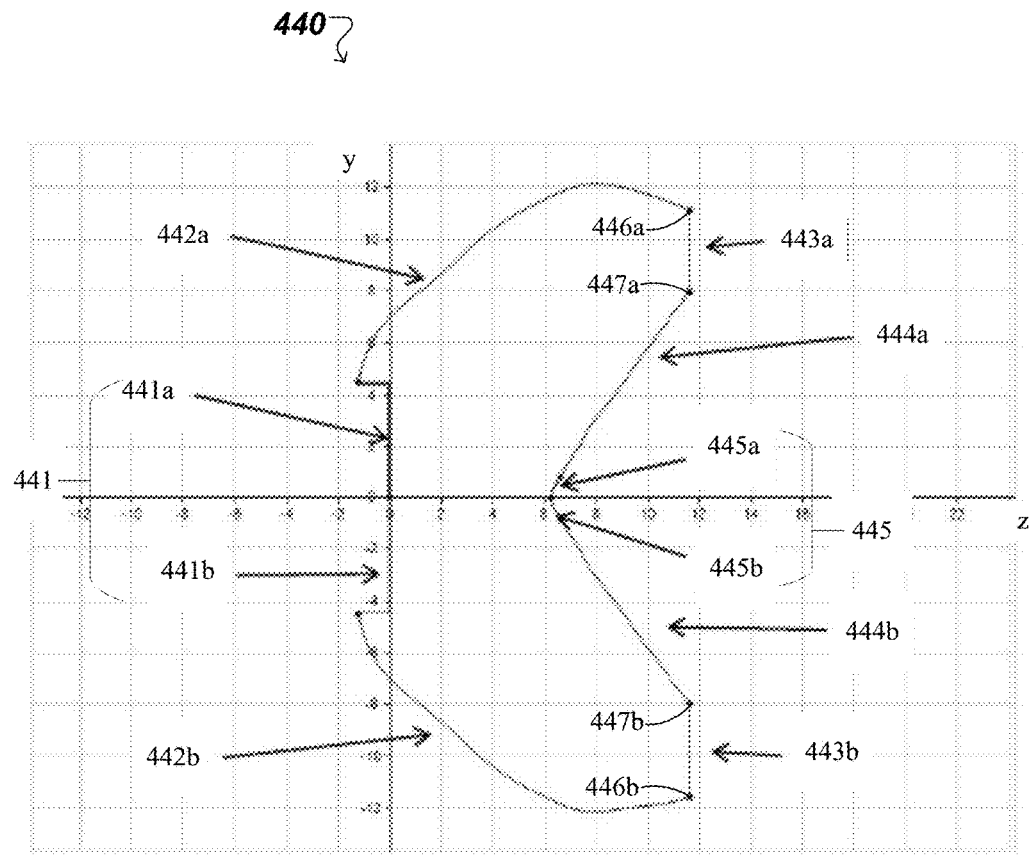
FIGS. 5A-5F show aspects of an optical extractor of the light guide luminaire module used in the troffer luminaire shown in FIGS. 4A-4B.

FIG. 5A is a cross-section in the (y-z) plane of an example implementation of the optical extractor 440 of the light guide luminaire module 401. The optical extractor 440 is formed from a solid material (with refractive index n>1). For example, the material can be glass with a refractive index of about 1.5. As another example, the material can be plastic with a refractive index of about 1.5-1.6. In this implementation, the optical extractor 440 includes an input surface 441 centered on the optical axis of the light guide (here, the z-axis); a first backward output surface 442a and a second backward output surface 442b arranged to mirror each other relative to the z-axis; a first forward output surface 443a and a second forward output surface 443b arranged to mirror each other relative to the z-axis; a first redirecting surface 444a and a second redirecting surface 444b arranged to mirror each other relative to the z-axis; and a third forward output surface 445 centered on the z-axis and opposing the input surface. Note that the first/second backward output surface 442a/442b intersects the first/second forward output surface 443a/443b at edge 446a/446b. Additionally, the first/second redirecting surface 444a/444b intersects the first/second forward output surface 443a/443b at vertex 447a/447b.

Figure 5B:
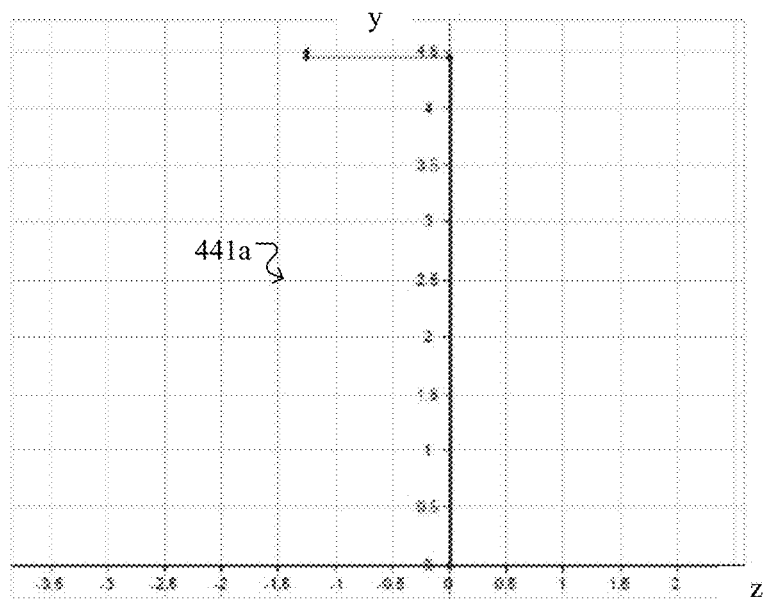

The input surface 441 is formed from a first input interface 441a (also referred to as the $1^{st}$ interface), which is represented above the z-axis in this example, and a second input interface 441b (also referred to as the $2^{nd}$ interface), which is represented below the z-axis in this example. FIG. 5B is a cross-section in the (y-z) plane of the $1^{st}$ interface 441a—the z and y axes have different scaling. Coordinates of a polyline corresponding to the $1^{st}$ interface 441a are given in Table 1. Coordinates of another polyline corresponding to the $2^{nd}$ interface 441b have sign-opposite y-values and same z-values as the coordinates given in Table 1.

TABLE 1

| $1^{st}$ interface 441a | | |
|---|---|---|
| Point | z (mm) | y (mm) |
| 1 | 0 | 0 |
| 2 | 0 | 4.45 |
| 3 | −1.25 | 4.45 |
| 4 | −1.25 | 4.50 |

The input surface 441 of the optical extractor 440 can be bonded to an output end of the light guide of the light guide luminaire module 401 (e.g., as described above in connection with FIG. 2A). In such case, an anti-reflective coating may be disposed between the output end of the light guide and optical extractor 440. If the material of the optical extractor 440 is different from the material from which the light guide is formed, for example an index matching layer may be disposed between the output end of the light guide and optical extractor 440. In other cases, the light guide and the optical extractor 440 can be integrally formed.

Figure 5C:
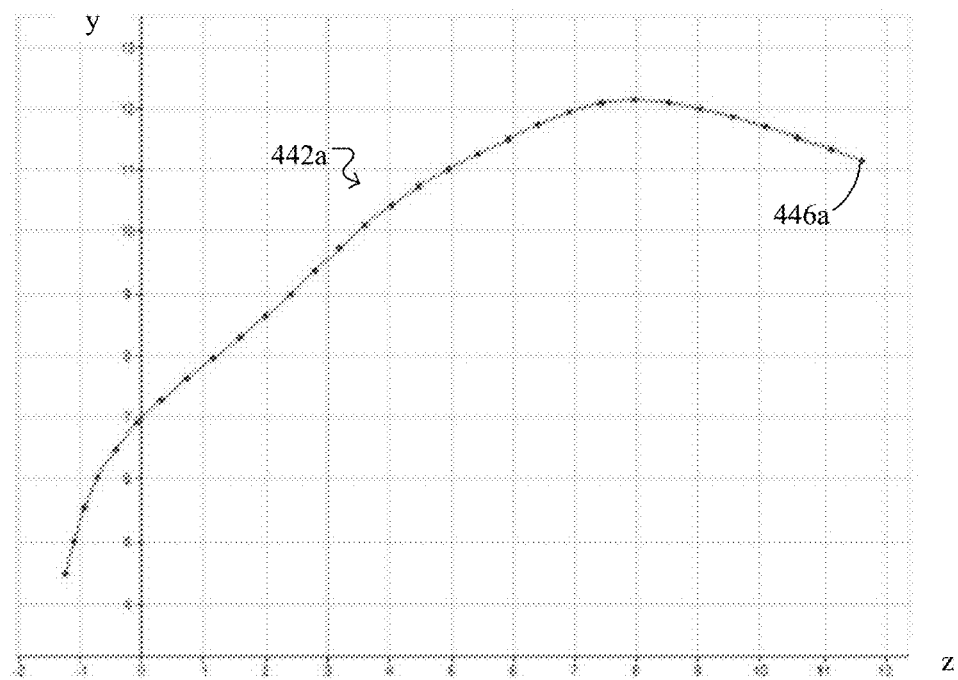

FIG. 5C is a cross-section in the (y-z) plane of the 1$^{st}$ backward output surface 442a. Coordinates of nodes for a fitted curve, e.g., a spline, corresponding to the first backward output surface 442a are given in Table 2. Coordinates of another spline corresponding to the 2$^{nd}$ backward output surface 442b have sign-opposite y-values and same z-values as the coordinates given in Table 2.

TABLE 2

1$^{st}$ backward output surface 442a

| Point | z (mm) | y (mm) |
|---|---|---|
| 1 | −1.25 | 4.5 |
| 2 | −1.11 | 5.02 |
| 3 | −0.94 | 5.54 |
| 4 | −0.72 | 6.04 |
| 5 | −0.44 | 6.50 |
| 6 | −0.09 | 6.92 |
| 7 | 0.30 | 7.29 |
| 8 | 0.72 | 7.64 |
| 9 | 1.15 | 7.97 |
| 10 | 1.56 | 8.31 |
| 11 | 1.99 | 8.65 |
| 12 | 2.34 | 9.01 |
| 13 | 2.79 | 9.39 |
| 14 | 3.19 | 9.75 |
| 15 | 3.60 | 10.11 |
| 16 | 4.03 | 10.44 |
| 17 | 4.48 | 10.74 |
| 18 | 4.95 | 11.02 |
| 19 | 5.43 | 11.27 |
| 20 | 5.92 | 11.51 |
| 21 | 6.41 | 11.74 |
| 22 | 6.91 | 11.95 |
| 23 | 7.43 | 12.10 |
| 24 | 7.97 | 12.15 |
| 25 | 8.51 | 12.11 |
| 26 | 9.05 | 12.00 |
| 27 | 9.57 | 11.87 |
| 28 | 10.09 | 11.71 |
| 29 | 10.60 | 11.54 |
| 30 | 11.11 | 11.35 |
| 31 | 11.62 | 11.16 |

Here, the first/second backward output surface 442a/442b of the optical extractor 440 is convex and, along with the first/second redirecting surface 444a/444b and a reflective surface of the first/second tertiary reflector 470'/470'', plays a major role in determining the luminance uniformity across the first/second tertiary reflector. Note that point 31 of the first/second backward output surface 442a/442b corresponds to the edge 446a/446b where the first/second backward output surface intersects the first/second forward output surface 443a/443b. In some implementations, the first/second backward output surface 442a/442b is uncoated. In other implementations, an anti-reflective coating may be provided on the first/second backward output surface 442a/442b such that light reflected by the first/second redirecting surface 444a/444b can transmit with minimal back reflection. In other implementations, the first/second backward output surface 442a/442b is coated with a diffusive coating (e.g., BrightView M PR05™ or BrightView M PR10™). In such cases, the light reflected by the first/second redirecting surface 444a/444b can diffuse upon transmission through the first/second backward output surface 442a/442b.

Figure 5D:
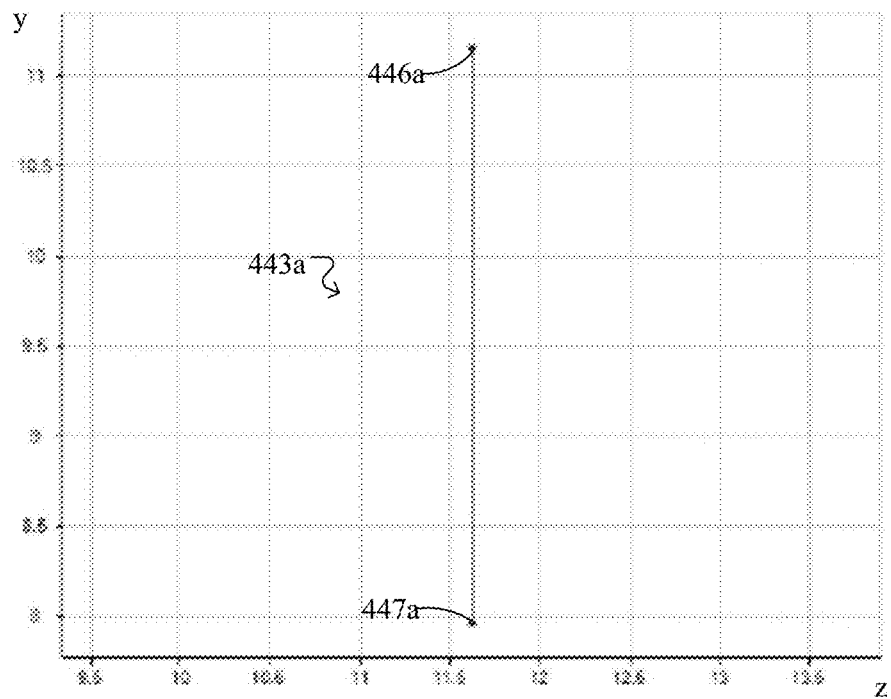

FIG. 5D is a cross-section in the (y-z) plane of the 1$^{st}$ forward output surface 443a. Coordinates of a polyline corresponding to the first forward output surface 443a are given in Table 3. Coordinates of another polyline corresponding to the 2$^{nd}$ forward output surface 443a have sign-opposite y-values and same z-values as the coordinates given in Table 3.

TABLE 3

1$^{st}$ forward output surface 443a

| Point | z (mm) | y (mm) |
|---|---|---|
| 1 | 11.62 | 11.16 |
| 2 | 11.62 | 7.97 |

Here, the first/second forward output surface 443a/443b of the optical extractor 440 is flat (or has a curvature that varies around zero). Note that point 1 of the first/second forward output surface 443a/443b corresponds to the edge 446a/446b where the first/second forward output surface intersects the first/second backward output surface 442a/442b; point 2 of the first/second forward output surface 443a/443b corresponds to the vertex 447a/447b where the first/second forward output surface intersects the first/second redirecting surface 444a/444b. In some implementations, the first/second forward output surface 443a/443b is uncoated. In other implementations, an anti-reflective coating may be provided on the first/second forward output surface 443a/443b such that guided light provided through the input surface 441 that reaches the first/second forward output surface can transmit there through with minimal back reflection. In other implementations, the first/second forward output surface 443a/443b is coated with a diffusive coating (e.g., BrightView M PR05™ or BrightView M PR10™). In such cases, guided light provided through the input surface 441 that reaches the first/second forward output surface 443a/443b can diffuse upon transmission there through.

Figure 5E:
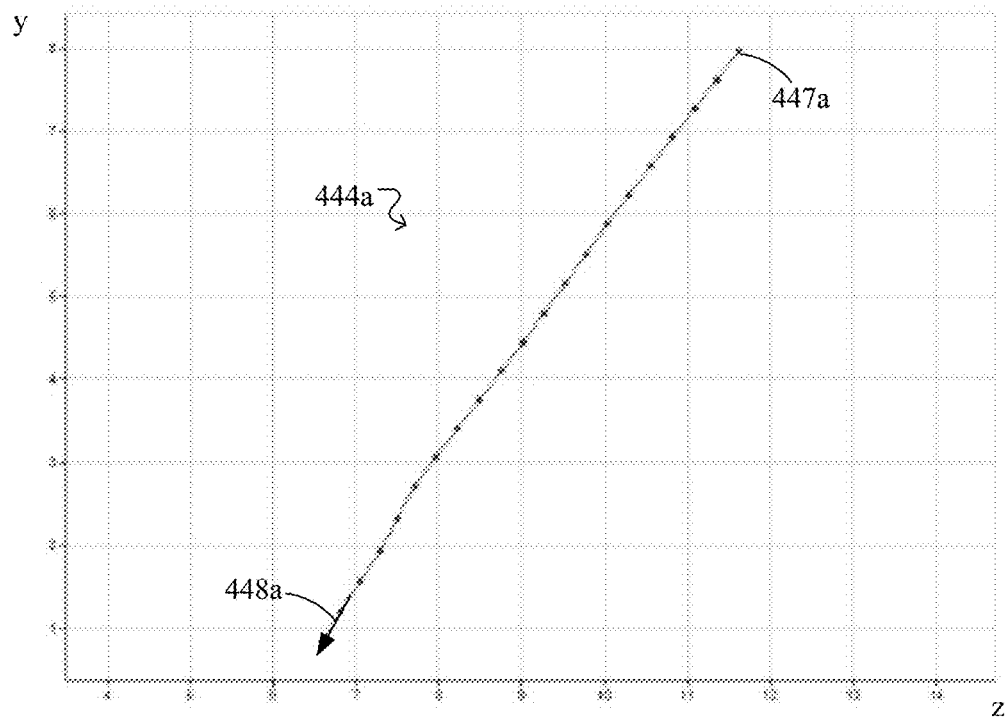

FIG. 5E is a cross-section in the (y-z) plane of the 1$^{st}$ redirecting surface 444a. Coordinates of nodes for a fitted curve, e.g., a spline, corresponding to the first redirecting surface 444a are given in Table 4. Coordinates of another spline corresponding to the 2$^{nd}$ redirecting surface 444b have sign-opposite y-values and same z-values as the coordinates given in Table 4.

TABLE 4

1$^{st}$ redirecting surface 444a

| Point | z (mm) | y (mm) |
|---|---|---|
| 1 | 11.62 | 7.97 |
| 2 | 11.35 | 7.62 |
| 3 | 11.09 | 7.28 |
| 4 | 10.82 | 6.93 |
| 5 | 10.56 | 6.58 |
| 6 | 10.29 | 6.23 |
| 7 | 10.03 | 5.88 |
| 8 | 9.78 | 5.52 |
| 9 | 9.53 | 5.17 |
| 10 | 9.27 | 4.81 |
| 11 | 9.02 | 4.45 |
| 12 | 8.76 | 4.10 |
| 13 | 8.49 | 3.76 |

TABLE 4-continued

1st redirecting surface 444a

| Point | z (mm) | y (mm) |
|---|---|---|
| 14 | 8.23 | 3.41 |
| 15 | 7.96 | 3.06 |
| 16 | 7.71 | 2.70 |
| 17 | 7.49 | 2.32 |
| 18 | 7.29 | 1.94 |
| 19 | 7.05 | 1.57 |
| 20 | 6.81 | 1.20 |
| 21 | 6.60 | 0.82 |

Here, the first/second redirecting surface 444a/444b of the optical extractor 440 is flat (i.e., has a curvature that varies around zero) or it is concave and, along with the first/second backward output surface 442a/442b and a reflective surface of the first/second tertiary reflector 470'/470", plays a major role in determining the luminance uniformity across the first/second tertiary reflector. Note that point 1 of the first/second redirecting surface 444a/444b corresponds to the vertex 447a/447b where the first/second redirecting surface intersects the first/second forward output surface 443a/443b. In some implementations, the first/second redirecting surface 444a/444b is uncoated. In such cases, guided light from the input surface 441 that impinges on the first/second redirecting surface 444a/444b at angles beyond a critical angle $\theta=\arcsin(1/n)$ relative to the respective surface normal reflects off the first/second redirecting surface via total internal reflection (TIR) towards the first/second backward output surface 442a/442b. In other implementations, the first/second redirecting surface 444a/444b is coated with a reflective coating. In such cases, guided light from the input surface 441 that impinges on the first/second redirecting surface 444a/444b reflects off via specular reflection or diffuse reflection or a combination thereof towards the first/second backward output surface 442a/442b.

Figure 5F:
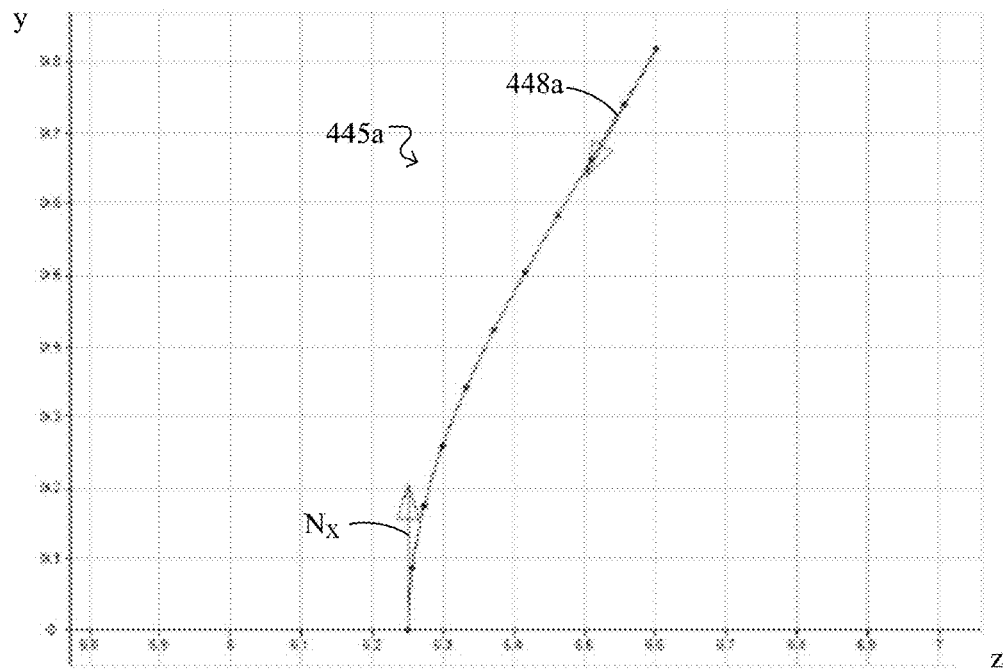

FIG. 5F is a cross-section in the (y-z) plane of a portion 445a of the third forward output surface 445. Coordinates of nodes for a fitted curve, e.g., a spline, corresponding to the portion 445a of the third forward output surface 445 are given in Table 5. Coordinates of another spline corresponding to portion 445b of the third forward output surface 445 have sign-opposite y-values and same z-values as the coordinates given in Table 5.

TABLE 5 portion 445a of third forward output surface 445

| Point | z (mm) | y (mm) |
|---|---|---|
| 1 | 6.60 | 0.81 |
| 2 | 6.56 | 0.74 |
| 3 | 6.51 | 0.66 |
| 4 | 6.46 | 0.58 |
| 5 | 6.42 | 0.50 |
| 6 | 6.37 | 0.42 |
| 7 | 6.33 | 0.34 |
| 8 | 6.30 | 0.26 |
| 9 | 6.27 | 0.17 |
| 10 | 6.26 | 0.09 |
| 11 | 6.25 | 0 |

Here, the third forward output surface 445 of the optical extractor 440 is concave. Note that slope 448a (and 448b—not shown in FIG. 5A or 5F) is continuous at the intersection of the portion 445a/445b of third forward output surface 445 with the first/second redirecting surface 444a/444b. In this manner, there are no vertices between the third forward output surface 445 and the adjacent first and second redirecting surfaces 444a, 444b. Also note that the third forward output surface 445 intersects the z-axis with a slope parallel to the y-axis. In some implementations, the third forward output surface 445 is uncoated. In other implementations, an anti-reflective coating may be provided on the third forward output surface 445 such that guided light provided through the input surface 441 that reaches the third forward output surface can transmit there through with minimal back reflection. In other implementations, the third forward output surface 445 is coated with a diffusive coating (e.g., BrightView M PR05™ or BrightView M PR10™). In such cases, guided light provided through the input surface 441 that reaches the third forward output surface 445 can diffuse upon transmission there through.

Note that a total depth of the optical extractor 440 in the forward direction (e.g., along the z-axis) is less than 14 mm (or about 0.5"), and a total width of the optical extractor in an orthogonal direction (e.g., along the y-axis) is about 24 mm (or less than 1").

Figure 5G:
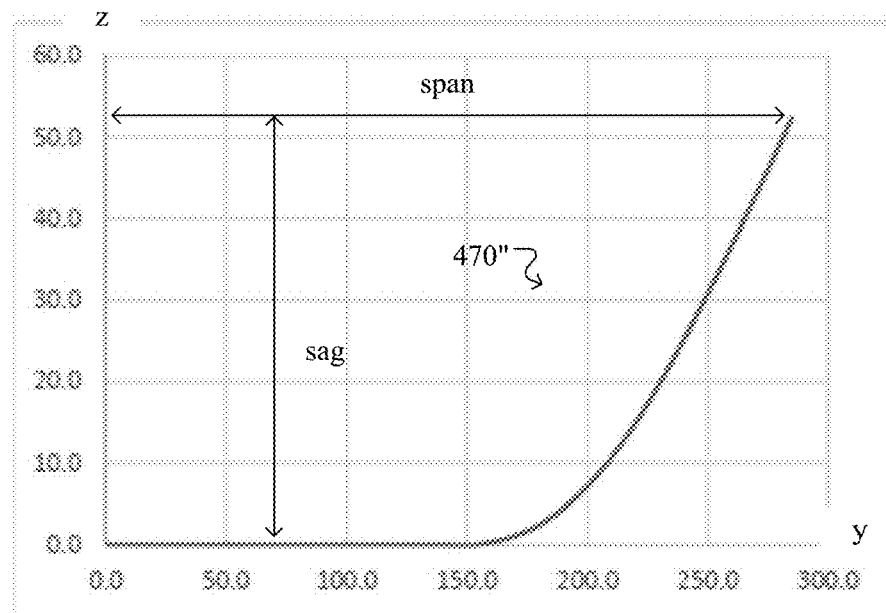
FIG. 5G show aspects of a tertiary reflector used in the troffer luminaire shown in FIGS. 4A-4B.

FIG. 5G is a cross-section in the (y-z) plane of the reflective surface of the second tertiary reflector 470". Coordinates of nodes for a fitted curve, e.g., a spline, corresponding to the reflective surface of the second tertiary reflector 470" are given in Table 6. Coordinates of another spline corresponding to the reflective surface of the first tertiary reflector 470' have sign-opposite y-values and same z-values as the coordinates given in Table 6.

TABLE 6 reflective surface of second tertiary reflector 470"

| Point | y (mm) | z (mm) |
|---|---|---|
| 1 | 0 | 0 |
| 2 | 9.5 | 0 |
| 3 | 19.0 | 0 |
| 4 | 28.5 | 0 |
| 5 | 38.0 | 0 |
| 6 | 47.5 | 0 |
| 7 | 57.0 | 0 |
| 8 | 66.5 | 0 |
| 9 | 76.0 | 0 |
| 10 | 85.5 | 0 |
| 11 | 95.0 | 0 |
| 12 | 104.5 | 0 |
| 13 | 114.0 | 0 |
| 14 | 123.5 | 0 |
| 15 | 133.0 | 0 |
| 16 | 142.5 | 0 |
| 17 | 152.0 | −0.01 |
| 18 | 161.5 | 0.41 |
| 19 | 171.0 | 1.19 |
| 20 | 180.5 | 2.49 |
| 21 | 190.0 | 4.42 |
| 22 | 199.5 | 7.03 |
| 23 | 209.0 | 10.33 |
| 24 | 218.5 | 14.27 |
| 25 | 228.0 | 18.78 |
| 26 | 237.5 | 23.77 |
| 27 | 247.0 | 29.10 |
| 28 | 256.5 | 34.67 |
| 29 | 266.0 | 40.40 |
| 30 | 275.5 | 46.28 |
| 31 | 285.0 | 52.39 |

Here, the reflective surface of the first/second tertiary reflector 470'/470" is concave and, along with the first/second redirecting surface 444a/444b and the first/second backward output surface 442a/442b of the optical extractor 440, plays a major role in determining the luminance uniformity across the first/second tertiary reflector. In this embodiment of the first/second tertiary reflector 470'/470" a portion of the reflective surface adjacent to the housing 402 is flat and a remaining portion of the reflective surface that is remote from the housing 402 is concave. The reflective surface of the first/second tertiary reflector 470'/470" is coated with a reflective coating. In such cases, light from the first/second backward output surface 442a/442b of the optical extractor 440 that impinges on the reflective surface of the first/second tertiary reflector 470'/470" reflects off via specular reflection or diffuse reflection or a combination thereof towards the first/second backward output surface 442a/442b. An example of diffusive coatings that can be used to cover the reflective surface of the first/second tertiary reflector 470'/470" is WhiteOptics White 98 F16™ (high angle diffusive film).

Note that a sag in the forward direction (e.g., along the z-axis) of the first/second tertiary reflector 470'/470" is less than 55 mm (or about 2"), and a span in an orthogonal direction (e.g., along the y-axis) of the first/second tertiary reflector is 285 mm (or about than 11"). The latter dimension of the first/second tertiary reflector 470'/470" and a thickness (along the y-axis) of order less than 1" for the housing 402 that supports the light guide luminaire module 401 and the first and second tertiary reflectors causes the troffer luminaire 400 to have a total span (along the y-axis) of 23-24". The forward output surfaces 443a/b of the extractor in this example are located at about 90% of the sag that is at z~47 mm. The forward output surfaces 443a/b of the extractor may be located between 70% to 95% of the sag, that is between about z~36 mm to z~50 mm with varying effects on the uniform appearance of respective troffer luminaires.

The above-described combination of shapes and relative orientations of the first/second redirecting surface 444a/444b and the first/second backward output surface 442a/442b of the optical extractor 440 and of the reflective surface of the first/second tertiary reflector 470'/470" was used to design the troffer luminaire 400 for which a ratio of maximum luminance to minimum luminance across each of the tertiary reflectors 470', 470" is lower than 3:1, as shown below in connection with FIG. 10.

Figures 8, 9, 10:
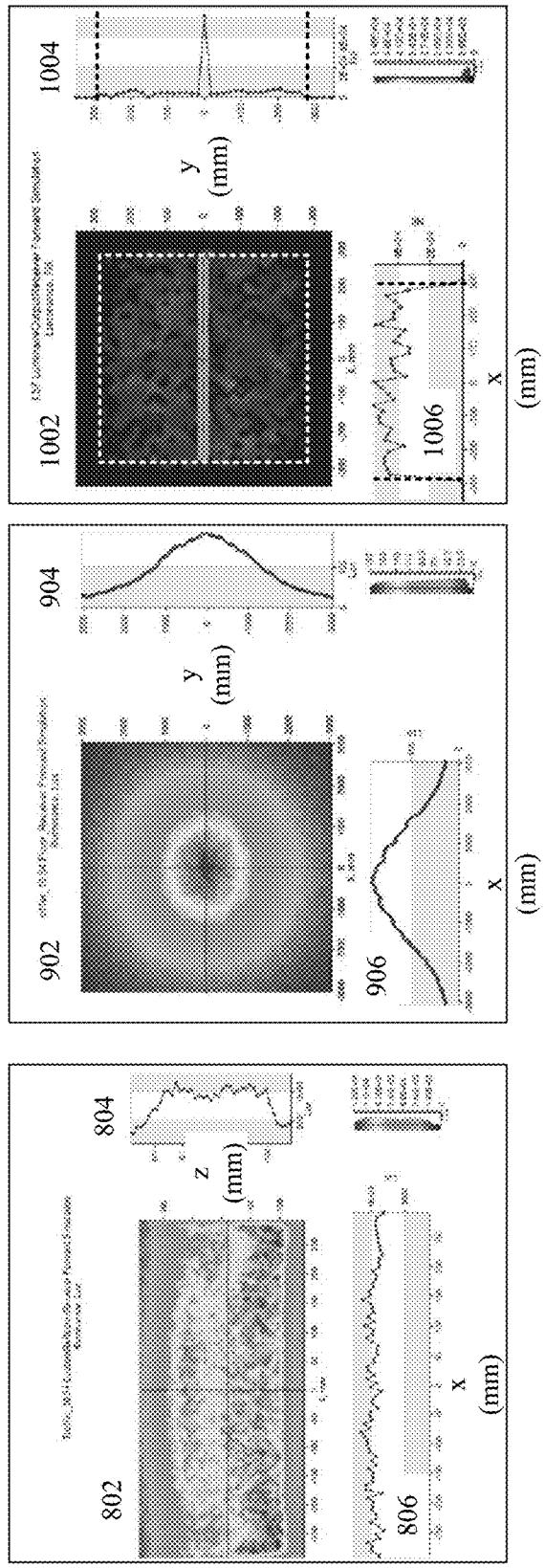
FIGS. 8, 9 and 10 show results of simulation of the troffer luminaire shown in FIGS. 4A-4B.

Moreover, (i) a choice of diffusive coatings applied on the transmissive first/second backward output surface 442a/442b of the optical extractor 440 of the light guide luminaire module 401 and reflective surface of the first/second tertiary reflector 470'/470"—which influences, at least in part, a total amount of indirect light visible by an observer underneath the troffer luminaire 400—and (ii) another choice of diffusive coatings applied on the transmissive first/second forward output surface 443a/443b and third forward output surface 445 of the optical extractor—which influences, at least in part, a total amount of direct light visible by the observer underneath the troffer luminaire—were made to design the troffer luminaire 400 for which another ratio of maximum luminance to minimum luminance across each of the tertiary reflectors 470', 470" and the bottom side of the optical extractor is lower than 15:1, as shown below in connection with FIG. 10.

Other troffer luminaires that use a light guide luminaire module and only a single tertiary reflector also can be designed to satisfy specified luminance uniformities, as described below.

Figure 6A:
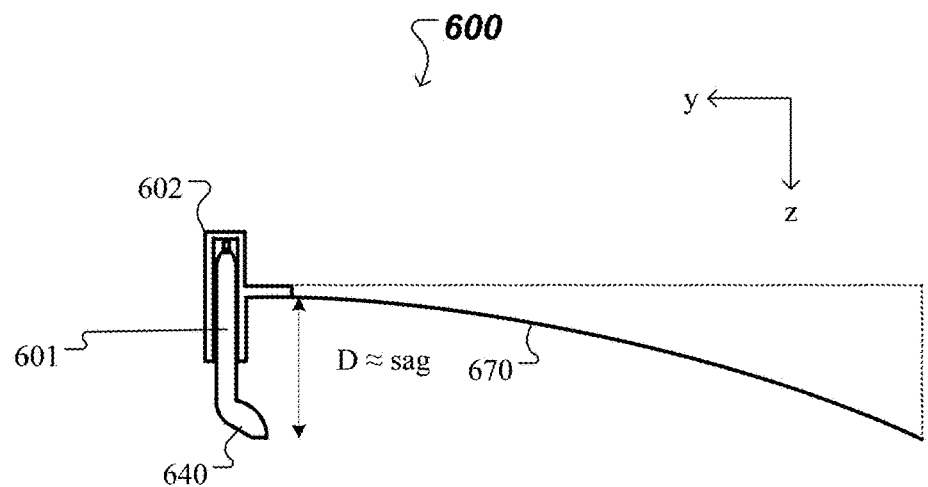
FIGS. 6A-6B show aspects of yet another troffer luminaire including an asymmetric light guide luminaire module and a single tertiary reflector that appears to be uniformly lit when viewed by an observer from directly underneath the light guide luminaire module.

Third Embodiment of Troffer Luminaire Including Light Guide Luminaire Module and a Tertiary Reflector FIG. 6A shows a side view of a troffer luminaire 600 that includes a light guide luminaire module 601 and a single tertiary reflector 670. Solid state light sources, optical couplers and a light guide of the light guide luminaire module 601 can be implemented like the corresponding components of the light guide luminaire module 201* described above in connection with FIG. 2B. An optical extractor 640 of the light guide luminaire module 601 lacks mirror symmetry relative to the optical axis of the light guide luminaire module 601 (parallel to the z axis) and can be implemented as described below in connection with FIG. 6B. A "front face" (referred to as a reflective surface) of the tertiary reflector 670, that faces the light guide luminaire module 601, can be implemented in a manner similar to the one described above in connection with FIGS. 1 and 5G, while a "rear face" can be implemented as a solid block or can have other forms/shapes. Note that while the plurality of solid state light sources and the optical couplers of the light guide luminaire module 601 are housed within the housing 602 (and not visible in FIG. 6A), the light guide of light guide luminaire module protrudes from the housing to lower the optical extractor 640 of light guide luminaire module by a distance D along the z-axis comparable to a sag of the tertiary reflector 670 in the (y,z) plane. The light guide luminaire module 601 and the tertiary reflector 670 are elongated along the x-axis (e.g., as shown in FIG. 2B) and can have a length L of about 2' or 4', corresponding to the size of conventional fluorescent light luminaires.

In this implementation, output surfaces of the optical extractor 640 of the light guide luminaire module 601, and the reflective surface of the tertiary reflector 670 are shaped and arranged with respect to one other such that the tertiary reflector 670 appears to be uniformly lit when viewed by an observer of the troffer luminaire 600 from directly underneath the optical extractor. For example, a ratio of maximum luminance to minimum luminance across the tertiary reflector 670 can be lower than 5:1, 4:1 or 3:1. In this manner, the observer can view a fully lit surface of the tertiary reflector 670 free of dark regions and/or hot spots.

Figure 6B:
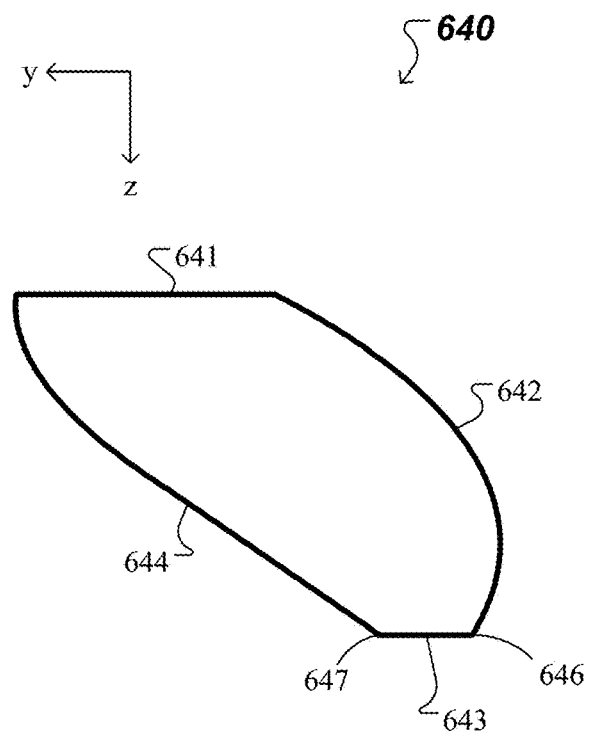

FIG. 6B is a cross-section in the (y-z) plane of an example implementation of the optical extractor 640 of the light guide luminaire module 601. Note that the optical extractor 640 is a single-sided optical extractor like the optical extractor 240* described above in connection with FIG. 2B. The optical extractor 640 is formed from a solid material (with refractive index n>1). For example, the material can be glass with a refractive index of about 1.5. As another example, the material can be plastic with a refractive index of about 1.5-1.6. In this implementation, the optical extractor 640 includes an input surface 641 centered on the optical axis of the light guide (here, the z-axis); a forward output surface 643 opposing the input surface 641; a backward output surface 642 extending from the input surface 641 to the forward output surface 643; and a redirecting surface 644 extending from the input surface 641 to the forward output surface 643 and opposing the backward output surface 642. Note that the backward output surface 642 intersects the forward output surface 643 at edge 646. Additionally, redirecting surface 644 intersects the forward output surface 643 at vertex 647.

The input surface 641 of the optical extractor 640 can be bonded to an output end of the light guide of the light guide luminaire module 601 (e.g., as described above in connection with FIG. 2B). In such case, an anti-reflective coating may be disposed between the output end of the light guide and optical extractor 640. If the material of the optical extractor 640 is different from the material from which the light guide is formed, for example an index matching layer may be disposed between the output end of the light guide and optical extractor 640. In other cases, the light guide and the optical extractor 640 can be integrally formed.

The backward output surface 642 of the optical extractor 640 is convex and, along with the redirecting surface 644 and the reflective surface of the tertiary reflector 670, plays a major role in determining the luminance uniformity across the tertiary reflector. In some implementations, the backward output surface 642 is uncoated. In other implementations, an anti-reflective coating may be provided on the backward output surface 642 such that light reflected by the redirecting surface 644 can transmit with minimal back reflection. In other implementations, the backward output surface 642 is coated with a diffusive coating (e.g., BrightView M PR05™ or BrightView M PR10™). In such cases, the light reflected by the redirecting surface 644 can diffuse upon transmission through the backward output surface 642.

The forward output surface 643 of the optical extractor 640 is flat (or has a curvature that varies around zero). In some implementations, the forward output surface 643 is uncoated. In other implementations, an anti-reflective coating may be provided on the forward output surface 643 such that guided light provided through the input surface 641 that reaches the forward output surface can transmit there through with minimal back reflection. In other implementations, the forward output surface 643 is coated with a diffusive coating (e.g., BrightView M PR05™ or BrightView M PR10™). In such cases, guided light provided through the input surface 641 that reaches the forward output surface 643 can diffuse upon transmission there through.

The redirecting surface 644 of the optical extractor 640 has a complex shape and, along with the backward output surface 642 and the reflective surface of the tertiary reflector 670, plays a major role in determining the luminance uniformity across the tertiary reflector. For example, the redirecting surface 644 is flat (i.e., has a curvature that varies around zero) over a portion adjacent the forward output surface 643 and convex over another portion adjacent the input surface 641. As another example, the redirecting surface 644 has an inflection point, i.e., is concave over a portion adjacent the forward output surface 643 and convex over another portion adjacent the input surface 641. In some implementations, the redirecting surface 644 is uncoated. In such cases, guided light from the input surface 641 that impinges on the redirecting surface 644 at angles beyond a critical angle θ=arcsine(1/n) relative to the respective surface normal reflects off the first/second redirecting surface via total internal reflection (TIR) towards the backward output surface 642. In other implementations, the redirecting surface 644 is coated with a reflective coating. In such cases, guided light from the input surface 641 that impinges on the redirecting surface 644 reflects off via specular reflection or diffuse reflection or a combination thereof towards the backward output surface 642.

Referring again to FIG. 6A, the reflective surface of the tertiary reflector 670 is concave and, along with the redirecting surface 644 and the backward output surface 642 of the optical extractor 640, plays a major role in determining the luminance uniformity across the tertiary reflector. The reflective surface of the tertiary reflector 670 is coated with a reflective coating. In such cases, light from the backward output surface 642 of the optical extractor 640 that impinges on the reflective surface of the tertiary reflector 670 reflects off via specular reflection or diffuse reflection or a combination thereof towards the first/second backward output surface 442a/442b. An example of diffusive coating that can be used to cover the reflective surface of the tertiary reflector 670 is WhiteOptics White 98 F16™ (high angle diffusive film).

The above-described combination of shapes and relative orientations of the redirecting surface 644 and the backward output surface 642 of the optical extractor 640 and of the reflective surface of the tertiary reflector 670 can be used to design the troffer luminaire 600 for which a ratio of maximum luminance to minimum luminance across the tertiary reflector 670 is lower than a first specified uniformity ratio, e.g., 3:1.

Moreover, (i) a choice of diffusive coatings applied on the transmissive backward output surface 642 of the optical extractor 640 of the light guide luminaire module 601 and the reflective surface of the tertiary reflector 670—which influences, at least in part, a total amount of indirect light visible by an observer underneath the troffer luminaire 600—and (ii) another choice of diffusive coatings applied on the transmissive forward output surface 642 of the optical extractor which influences, at least in part, a total amount of direct light visible by the observer underneath the troffer luminaire—can be made to design the troffer luminaire 600 for which another ratio of maximum luminance to minimum luminance across the tertiary reflector 670 and the bottom side of the optical extractor is lower than a second specified uniformity ratio, e.g., 15:1.

Samples of the troffer luminaire 400, described above in connection with FIGS. 4A-4B and 5A-5G, have been fabricated and experiments have been conducted to evaluate their respective performance. Some of these experiments are summarized below.

Experimental Results for the Second Embodiment of Troffer Luminaire

To carry out the following experiments, the solid state light sources of the light guide luminaire module 401 used in the troffer luminaire 400 were implemented as either Luxeon Z ES (with one LED per channel of the optical couplers 320) or Luxeon Z (with two LEDs per channel of the optical couplers). For either of the foregoing implementations, the LEDs were modeled using ray data sets supplied by Lumileds™. The first and second backward output surfaces 442a, 442b of the optical extractor 440 were left uncovered or were covered with a diffuse film implemented as either Brightview MPR05™ or Brightview MPR10™. For either of the foregoing implementations, characteristics of the diffusive surfaces were modeled using BSDF data files supplied by Brightview™. Moreover, the reflective surface of the tertiary reflectors 470', 470" was covered with a diffuse film implemented as WhiteOptics White 98 F16™ (high angle diffusive film). Additionally, a width (along the x-axis) of the light guide luminaire module 401 and the tertiary reflectors 470', 470" included in the troffer luminaire 400 is L=0.578 m.

Some experimental results for the troffer luminaire 400 that includes (i) the light guide luminaire module 401 with the optical extractor 440 and (ii) the tertiary reflectors 470', 470" are summarized in Table 7. Here, the light source of the light guide luminaire module 401 is based on Luxeon Z (i.e., with two LEDs per channel of the optical couplers: 2×42 lm=48 lm per channel). As the light guide luminaire module 401 has 48 channels, the total power emitted by the light source of the light guide luminaire module is 4032 lm. The foregoing light source is simulated using 2e+6 rays. Unless otherwise specified, the diffusive film applied on the first and second backward output surfaces 442a, 442b of the optical extractor 440 is Brightview MPR10™. All power levels in Table 7 are in lumens and are measured using a far-field detector.

TABLE 7

| Result | Value |
|---|---|
| Power measured in far field (w/o diffusive film on backward output surfaces 442a, 442b) | 3709 |
| Overall Total efficiency (w/o diffusive film on backward output surfaces 442a, 442b) | 92% |
| Power measured in far field | 3356 |
| Overall Total efficiency | 83% |
| Power corresponding to direct illumination (due to light provided from forward output surfaces 443a, 443b, 445) | 683 |
| Power corresponding to indirect illumination (due to light output through backward output surfaces 442a, 442b and then provided from tertiary reflectors 470', 470") | 2673 |
| Ratio direct to indirect | 26% |

Figure 7:
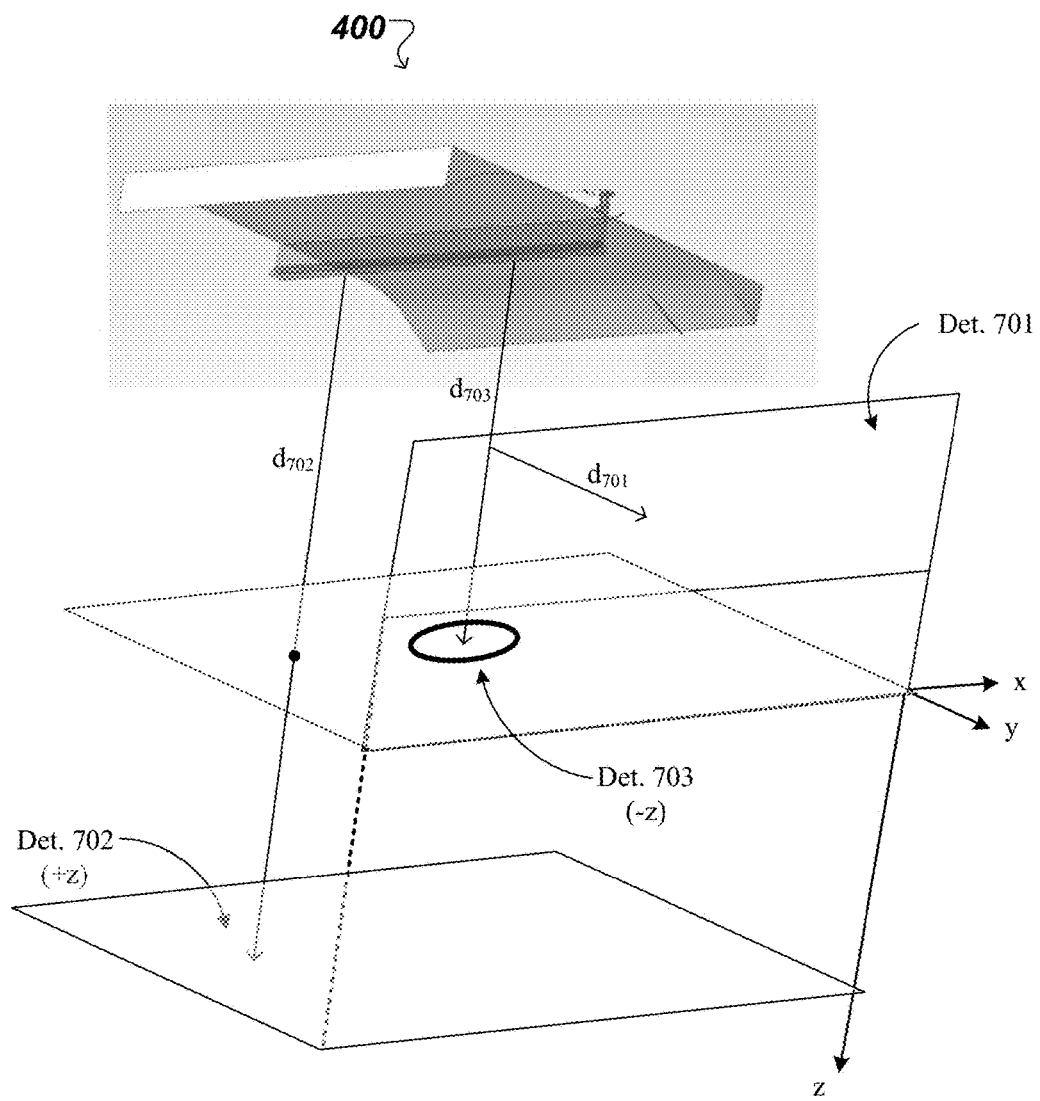
FIG. 7 shows arrangements of detectors used in simulations of the troffer luminaire shown in FIGS. 4A-4B.

Additional experiments were performed on the troffer luminaire 400 using an experimental setup shown in FIG. 7. Here, the troffer luminaire 400 is arranged with the light guide of its light guide luminaire module 401 parallel to the z-axis and has its elongated dimension aligned with the x-axis. To characterize illumination of a wall of a room in which the troffer luminaire 400 is installed, illuminance (in Lux) is measured for light provided by the troffer luminaire to a first planar detector 701 disposed parallel to the (x,z) plane and spaced apart by a distance $d_{701}$ from the extractor 440 of the light guide luminaire module 401. Further, to characterize illumination of the floor underneath the troffer luminaire 400, illuminance (in Lux) is measured for light provided by the troffer luminaire to a second planar detector 702 disposed parallel to the (x,y) plane and spaced apart by a distance $d_{702}$ from the extractor 440 of the light guide luminaire module 401. Furthermore, to determine whether each of the tertiary reflectors 470', 470" and the bottom side of the optical extractor 440 of the light guide luminaire module 401 appear to be uniformly lit when observed from directly underneath the optical extractor, luminance (in Nits) is measured across each of the tertiary reflectors and the bottom side of the optical extractor by "looking through" a third aperture detector 703 disposed parallel to the (x,y) plane and spaced apart by a distance $d_{703}$ below the optical extractor. Table 8 summarizes configurations of the detectors used in this study.

TABLE 8

| Detector | Type | Plane | $D_X$ (m) | $D_Z$ or $D_Y$ (m) | diameter (mm) | $d_{70\#}$ (m) |
|---|---|---|---|---|---|---|
| 701 | Planar | (x, z) | 0.6 | 0.3 | N/A | $d_{701}$ |
| 702 | Planar | (x, y) | 6 | 6 | N/A | 2.743 |
| 703 | Aperture | (x, y) | N/A | N/A | 16 | 1 |

Results of the additional experiments performed on the troffer luminaire 400 using the experimental setup shown in FIG. 7 are described below.

FIG. 8 shows an illuminance (x,z)-contour plot 802 measured by the first planar detector 701 (see Table 8) for light output by the troffer luminaire 400. FIG. 8 also shows a z-axis cross-section 804 that represents vertical variation of the illuminance for light output by the troffer luminaire 400 at the center of the first planar detector 701, and an x-axis cross-section 806 that represents horizontal variation of the illuminance for light output by the troffer luminaire at half height of the first planar detector. Theses experimental results indicate vertical and horizontal uniformity of illumination provided by the light output by the troffer luminaire 400 to a "lateral wall" disposed parallel to the side surfaces of the light guide of the light guide luminaire module 401 included in the troffer luminaire.

FIG. 9 shows an illuminance (x,y)-contour plot 902 measured by the second planar detector 702 (see Table 8) for light output by the troffer luminaire 400. FIG. 9 also shows a y-axis cross-section 904 that represents first variation of the "floor illuminance" along a first direction orthogonal to the elongation of the light guide luminaire module 401 included in the troffer luminaire 400. Additionally, FIG. 9 shows an x-axis cross-section 906 that represents second variation of the floor illuminance along a second direction parallel to the elongation of the light guide luminaire module 401 included in the troffer luminaire 400.

FIG. 10 shows a luminance (x,y)-contour plot 1002 measured looking through the third aperture detector 703 (see Table 8) at light output by the troffer luminaire 400. The dotted-line rectangle overlaid onto the luminance (x,y)-contour plot 1002 indicates a footprint of the tertiary reflectors 470', 470" of the troffer luminaire 400. FIG. 10 also shows a y-axis cross-section 1004 that represents first variation of the luminance of the troffer luminaire 400 across the first tertiary reflector 470', the bottom of the extractor 440 of the light guide luminaire module 401 and the second tertiary reflector 470" of the troffer luminaire. The dotted lines overlaid onto the y-axis cross-section 1004 indicate edges of the tertiary reflectors 470', 470" of the troffer luminaire 400. Additionally, FIG. 10 shows an x-axis cross-section 1006 that represents second variation of the luminance of the troffer luminaire 400 along the bottom of the extractor 440 of the light guide luminaire module 401 of the troffer luminaire. The dotted lines overlaid onto the x-axis cross-section 1006 indicate edges of the tertiary reflectors 470', 470" of the troffer luminaire 400.

The results summarized in plots 1002, 1004 and 1006 of FIG. 10 indicate that the choice of shapes and relative orientations of the first/second redirecting surface 444a/444b and the first/second backward output surface 442a/442b of the optical extractor 440 and of the reflective surface of the first/second tertiary reflector 470'/470" that was made for designing the troffer luminaire 400 led to a ratio of maximum luminance to minimum luminance across each of the tertiary reflectors 470', 470" that is lower than 3:1. In this manner, each of the tertiary reflectors 170', 170" appears to be uniformly lit, free of dark regions and/or hot spots, when viewed by an observer of the troffer luminaire 400 from directly underneath the optical extractor.

Additionally, the results summarized in plots 1002, 1004 and 1006 of FIG. 10 further indicate that (i) the choice of diffusive coatings applied on the transmissive first/second backward output surface 442a/442b of the optical extractor 440 of the light guide luminaire module 401 and reflective surface of the first/second tertiary reflector 470'/470"—which influences, at least in part, a total amount of indirect light visible by an observer underneath the troffer luminaire 400—and (ii) the other choice of diffusive coatings applied on the transmissive first/second forward output surface 442a/442b and third forward output surface 445 of the optical extractor—which influences, at least in part, a total amount of direct light visible by the observer underneath the troffer luminaire that were made for designing the troffer luminaire 400 led to another ratio of maximum luminance to minimum luminance across each of the tertiary reflectors 470', 470" and the bottom side of the optical extractor that is lower than 15:1.

The preceding figures and accompanying description illustrate example methods, systems and devices for illumination. It will be understood that these methods, systems, and devices are for illustration purposes only and that the described or similar techniques may be performed at any appropriate time, including concurrently, individually, or in combination. In addition, many of the steps in these processes may take place simultaneously, concurrently, and/or in different orders than as shown. Moreover, the described methods/devices may use additional steps/parts, fewer steps/parts, and/or different steps/parts, as long as the methods/devices remain appropriate.

In other words, although this disclosure has been described in terms of certain aspects or implementations and generally associated methods, alterations and permutations of these aspects or implementations will be apparent to those skilled in the art. Accordingly, the above description of example implementations does not define or constrain this disclosure. Further implementations are described in the following claims.

What is claimed is:

1. An illumination device comprising:
   a plurality of light-emitting elements (LEEs) arranged to emit light in a forward direction, the LEEs distributed along a transverse direction orthogonal to the forward direction;
   one or more optical couplers, wherein the light provided by the LEEs to the optical couplers is in a first angular range;
   a light guide comprising a pair of opposing side surfaces arranged in parallel along the transverse direction and extending from a receiving end of the light guide to an opposing end of the light guide, wherein
      the optical couplers are arranged to receive the light provided by the LEEs and redirect it to the receiving end of the light guide in a second angular range,
      the light guide is configured to guide light received at the receiving end from the optical couplers in the forward direction to the opposing end, and
      a numerical aperture of the light guide is such that the light received from the optical couplers in the second angular range can be guided by the light guide through TIR off the pair of opposing side surfaces;
   an optical extractor elongated along the transverse direction and located at the opposing end of the light guide to redirect at least some of the guided light and to output at least some of the redirected light in an ambient environment as first output light in a first backward angular range along a first one of the pair of opposing side surfaces of the light guide; and
   a first reflector adjacent the first one of the pair of opposing side surfaces of the light guide and spaced apart from the optical extractor to reflect the light in the first backward angular range in a first forward angular range toward a target surface,
   wherein a first combination of the optical extractor and the first reflector is configured such that a ratio of maximum luminance to minimum luminance across the first reflector is less than a first predetermined ratio.

2. The illumination device of claim 1, wherein the first predetermined ratio is less than 5:1.

3. The illumination device of claim 2, wherein the first predetermined ratio is less than 3:1.

4. The illumination device of claim 1, wherein the optical extractor comprises a solid optic including:
   an input surface to receive the guided light,
   a first forward output surface that is flat, the first forward output surface to transmit at least a portion of the guided light to the ambient environment in a third forward angular range,
   a first backward output surface that is convex and extends between the input surface and the first forward output surface, and
   a first redirecting surface that extends between the input surface and the first forward output surface, the first redirecting surface to reflect another portion of the guided light toward first backward output surface, the first backward output surface to transmit the reflected light to the ambient environment in the first backward angular range.

5. The illumination device of claim 4, wherein the first backward output surface is a diffuse-transmissive surface.

6. The illumination device of claim 4, wherein the first redirecting surface is convex over a portion adjacent to the input surface and is flat over a portion adjacent the first forward output surface.

7. The illumination device of claim 6, wherein the first redirecting surface and the first forward output surface intersect at a vertex.

8. The illumination device of claim 1, wherein the first reflector includes a diffuse-reflective surface.

9. The illumination device of claim 1, wherein the LEEs are LEDs that emit white light.

10. The illumination device of claim 1, wherein a distance from an edge of the first reflector adjacent the light guide to an edge of the optical extractor remote from the light guide is less than 3".

11. The illumination device of claim 1, wherein the first reflector is concave and has a sag that is less than 3".

12. The illumination device of claim 1, wherein
    the optical extractor is configured to output some other of the redirected light in the ambient environment as second output light in a second backward angular range along a second one of the pair of opposing side surfaces of the light guide,
    the illumination device further comprising a second reflector adjacent the second one of the pair of opposing side surfaces of the light guide and spaced apart from the optical extractor to reflect the light in the second backward angular range in a second forward angular range toward the target surface, and
    a second combination of the optical extractor and the second reflector is configured such that a ratio of maximum luminance to minimum luminance across the second reflector is less than a second predetermined ratio.

13. The illumination device of claim 12, a third combination of the optical extractor, the first reflector and the second reflector is configured such that a ratio of maximum luminance to minimum luminance across the optical extractor, the first reflector and the second reflector is less than a third predetermined ratio.

14. The illumination device of claim 13, wherein the third predetermined ratio is less than 20:1.

15. The illumination device of claim 12, wherein the optical extractor comprises a solid optic including:
    an input surface to receive the guided light,
    a first forward output surface that is flat and a second forward output surface that is flat, the first and second forward output surfaces arranged to be mirror symmetric relative to the light guide and configured to transmit a portion of the guided light to the ambient environment in a third forward angular range, a first backward output surface that is convex and extends between the input surface and the first forward output surface, and a second backward output surface that is convex and extends between the input surface and the second forward output surface, the first and second backward output surfaces arranged to be mirror symmetric relative to the light guide, a third forward output surface configured to transmit another portion of the guided light to the ambient environment in the third forward angular range, and a first redirecting surface that extends between the first forward output surface and the third forward output surface, and a second redirecting surface that extends between the second forward output surface and the third forward output surface, the first and second redirecting surfaces arranged to be mirror symmetric relative to the light guide, the first redirecting surface to reflect yet another portion of the guided light toward the first backward output surface, the first backward output surface to transmit the light reflected by the first redirecting surface to the ambient environment in the first backward angular range, and the second redirecting surface to reflect the remaining guided light toward the second backward output surface, the second backward output surface to transmit the light reflected by the second redirecting surface to the ambient environment in the second backward angular range.

16. The illumination device of claim 15, wherein the third forward output surface is concave.

17. The illumination device of claim 12, wherein the first and second reflectors are arranged to be mirror symmetric relative to the light guide.

18. The illumination device of claim 12, wherein the first and second reflectors include diffuse-reflective surfaces.

19. The illumination device of claim 12, wherein the second predetermined ratio is equal to the first predetermined ratio.

20. A troffer luminaire comprising
the illumination device of claim 1, and
a housing configured to support the illumination device.

21. The troffer luminaire of claim 20, wherein a dimension of the housing along the forward direction is less than 3".

* * * * *